US011457302B2

(12) United States Patent
Kim et al.

(10) Patent No.: US 11,457,302 B2
(45) Date of Patent: Sep. 27, 2022

(54) ELECTRONIC DEVICE FOR PERFORMING COMMUNICATION CONNECTION TO EXTERNAL ELECTRONIC DEVICE AND OPERATION METHOD THEREOF

(71) Applicant: Samsung Electronics Co., Ltd., Suwon-si (KR)

(72) Inventors: Seungnyun Kim, Suwon-si (KR); Hyeonggeun Kim, Suwon-si (KR); Daehui Kang, Suwon-si (KR); Doosuk Kang, Suwon-si (KR); Jeongmin Park, Suwon-si (KR); Chunho Park, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 17/097,243

(22) Filed: Nov. 13, 2020

(65) Prior Publication Data

US 2021/0152917 A1 May 20, 2021

(30) Foreign Application Priority Data

Nov. 15, 2019 (KR) .................. 10-2019-0146774

(51) Int. Cl.
*G06F 3/16* (2006.01)
*H04R 1/10* (2006.01)
*H04W 76/10* (2018.01)

(52) U.S. Cl.
CPC .......... *H04R 1/1041* (2013.01); *G06F 3/165* (2013.01); *H04R 1/1016* (2013.01); *H04W 76/10* (2018.02); *H04R 2420/07* (2013.01)

(58) Field of Classification Search
CPC ............... H04R 1/1041; H04R 1/1016; H04R 2420/07; H04W 76/10; G06F 3/165
See application file for complete search history.

(56) References Cited

U.S. PATENT DOCUMENTS 9,973,845 B2    5/2018  Chawan et al.
2008/0242365 A1* 10/2008  Rokusek ............... H04W 68/02
                                                    455/41.2
(Continued)

FOREIGN PATENT DOCUMENTS

KR        10-0703316 B1     4/2007
KR     10-2017-0082022 A    7/2017
(Continued)

OTHER PUBLICATIONS

International Search Report and Written Opinion dated Mar. 18, 2021, issued in International Application No. PCT/KR2020/016027.

*Primary Examiner* — Joseph Saunders, Jr.
(74) *Attorney, Agent, or Firm* — Jefferson IP Law, LLP

(57) ABSTRACT

An electronic device is provided. The electronic device includes a speaker, a communication circuit, a processor operably connected to the speaker and the communication circuit, and a memory operably connected to the processor, wherein the memory stores instructions for causing the processor, when executed, to identify a first wireless communication connection event, when the first wireless communication connection event is identified, select one wireless communication connection list from among a first wireless communication connection list of the electronic device and a second wireless communication connection list of a counterpart electronic device, identify, from the selected wireless communication connection list, an external electronic device for which a wireless communication connection is to be established, establish a wireless communication connection to the external electronic device identified from the selected wireless communication connection list, and output, through the speaker, a signal received from the (Continued)

identified external electronic device. Various embodiments are possible.

20 Claims, 13 Drawing Sheets

(56) References Cited

U.S. PATENT DOCUMENTS

| | | | |
|---|---|---|---|
| 2011/0320535 A1* | 12/2011 | Donaldson | H04L 63/061 |
| | | | 709/204 |
| 2015/0326990 A1 | 11/2015 | Yeh et al. | |
| 2018/0356881 A1 | 12/2018 | Belverato | |
| 2019/0335264 A1 | 10/2019 | Watson et al. | |

FOREIGN PATENT DOCUMENTS

| | | |
|---|---|---|
| KR | 10-2017-0105795 A | 9/2017 |
| KR | 10-1875918 B1 | 7/2018 |
| KR | 10-1889023 B1 | 8/2018 |
| KR | 10-2019-0119559 A | 10/2019 |

\* cited by examiner

ELECTRONIC DEVICE FOR PERFORMING COMMUNICATION CONNECTION TO EXTERNAL ELECTRONIC DEVICE AND OPERATION METHOD THEREOF

CROSS-REFERENCE TO RELATED APPLICATION(S)

This application is based on and claims priority under 35 U.S.C. § 119(a) of a Korean patent application number 10-2019-0146774, filed on Nov. 15, 2019, in the Korean Intellectual Property Office, the disclosure of which is incorporated by reference herein in its entirety.

BACKGROUND

1. Field

The disclosure relates to an electronic device for performing a communication connection to an external electronic device and an operation method thereof.

2. Description of Related Art

With the development of digital technology, in order to output audio data reproduced in an audio source device such as a mobile communication terminal, a personal digital assistant (PDA), an electronic notebook, a smartphone, a tablet personal computer (PC), or a wearable device, various electronic devices such as earphones, earbuds, wireless speakers, or wireless headsets are becoming popular. The electronic devices may receive audio data from an audio source device via a wireless communication connection to an audio source device.

The above information is presented as background information only to assist with an understanding of the disclosure. No determination has been made, and no assertion is made, as to whether any of the above might be applicable as prior art with regard to the disclosure.

SUMMARY

An electronic device capable of outputting audio data may be used in an environment where multiple audio source devices exist. In such an environment, an electronic device establishes a wireless communication connection to an audio source device which has been previously connected among multiple audio source devices.

Accordingly, there is a possibility that an electronic device does not perform a wireless communication connection to an audio source device desired by a user. In addition, in case that an electronic device is to perform a wireless communication connection to an audio source device desired by a user, the user may have to perform a separate manipulation for a wireless communication connection in the audio source device.

Aspects of the disclosure are to address at least the above-mentioned problems and/or disadvantages and to provide at least the advantages described below. Accordingly, an aspect of the disclosure is to provide an electronic device for performing a communication connection to an external electronic device and an operation method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a speaker, a communication circuit, a processor operably connected to the speaker and the communication circuit, and a memory operably connected to the processor, wherein the memory stores instructions for causing the processor, when executed, to identify a wireless communication connection event, when the wireless communication connection event is identified, select one wireless communication connection list from among a first wireless communication connection list of the electronic device and a second wireless communication connection list of a counterpart electronic device, identify, from the selected wireless communication connection list, an external electronic device for which a wireless communication connection is to be established, establish a wireless communication connection to the external electronic device identified from the selected wireless communication connection list, and output, through the speaker, a signal received from the identified external electronic device.

In accordance with another aspect of the disclosure, a method for operating an electronic device is provided. The method includes identifying a wireless communication connection event, when the wireless communication connection event is identified, selecting one wireless communication connection list from among a first wireless communication connection list of the electronic device and a second wireless communication connection list of a counterpart electronic device, identifying, from the selected wireless communication connection list, an external electronic device for which a wireless communication connection is to be established, establishing, by using a communication circuit of the electronic device, a wireless communication connection to the external electronic device identified from the selected wireless communication connection list, and outputting, through a speaker of the electronic device, a signal received from the identified external electronic device.

An electronic device and an operation method thereof according to various embodiments may identify an audio source device desired by a user in an environment where multiple audio source devices exist, and may perform a wireless communication connection to the identified audio source device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
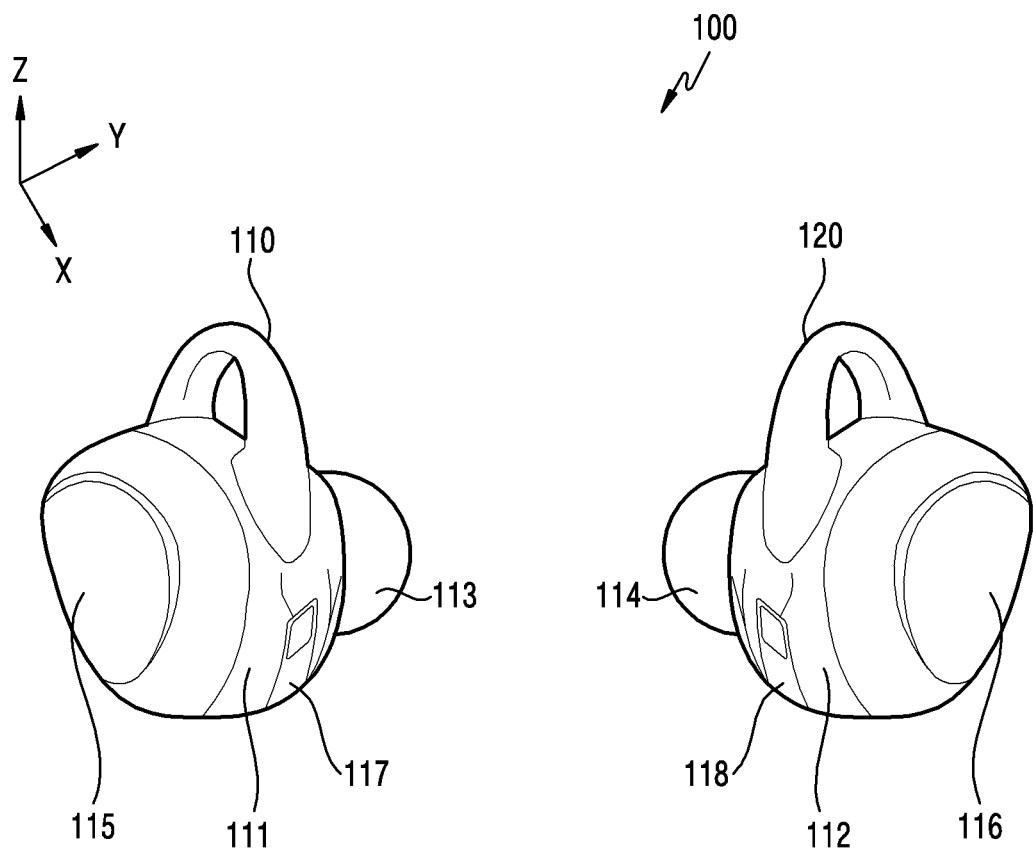
FIG. 1 illustrates a set of electronic devices according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., memory 280, which may comprise internal memory or external memory) that is readable by a machine (e.g., the first electronic device 110). For example, a processor (e.g., the processor 210) of the machine (e.g., the first electronic device 110) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates a set of electronic devices according to an embodiment of the disclosure.

Referring to FIG. 1, an electronic device set 100 may include a first electronic device 110 and a second electronic device 120 having shapes (for example: ear-wearable types) capable of operating in a state of being worn on (or inserted into) a user's body (for example: ears). In an embodiment, an electronic device set 100 may be referred to as an earphone set including a first electronic device 110 and a second electronic device 120. In an embodiment, a first electronic device 110 and a second electronic device 120 may be referred to as earphones. FIG. 1 exemplifies that a first electronic device 110 and a second electronic device 120 have earphone shapes, but this is merely an example. In an embodiment, a first electronic device 110 or a second electronic device 120 may have the shape of one among an earphone, an earbud, a wireless speaker, or a wireless headset.

In an embodiment, a first electronic device 110 may be an electronic device including a speaker and a microphone. In addition, a first electronic device 110 may include a body 111, an ear tip 113, at least one key button 115, at least one sensor 117, or a combination thereof.

In an embodiment, when a user wears (or inserts) a first electronic device 110, an ear tip 113 (or an ear cap) of the first electronic device 110 may be a part coming into close contact with a part of the user's body (for example: the auricle of an ear). In an embodiment, an ear tip 113 may be made of a material having elasticity. In an embodiment, an ear tip 113 may be composed in a cylindrical shape corresponding to the auricle of a human ear. In an embodiment, an ear tip 113 may be composed to be detachable to and attachable from a body 111 of a first electronic device 110.

In an embodiment, at least one key button 115 may produce a signal for controlling an operation of a first electronic device 110. In an embodiment, a signal for controlling an operation may include a signal such as power-on, power-off, volume control, data reproduction start (or play), data reproduction pause, data reproduction stop, or data reproduction speed adjustment. In an embodiment, at least one key button 115 may include a physical button, an optical key, a keypad, or a combination thereof.

In an embodiment, at least one sensor 117 may include an acceleration sensor, a gyro sensor, a geomagnetic sensor, a heart rate sensor, a proximity sensor, a light sensor, a galvanic skin response (GSR) sensor, an electrocardiogram sensor, an electromyogram sensor, a blood sugar sensor, a blood pressure sensor, a pressure sensor, a temperature sensor, or a combination thereof. In an embodiment, at least one sensor 117 may be disposed to be in close contact with at least a part of a human body in a state where a first electronic device 110 is worn on (or inserted into) the human body.

In an embodiment, a second electronic device 120 may be a counterpart electronic device corresponding to a first electronic device 110. In an embodiment, a second electronic device 120 may include a body 112, an ear tip 114, at least one key button 116, at least one sensor 118, or a combination thereof. In an embodiment, a body 112, an ear tip 114, at least one key button 116, and at least one sensor 118 of a second electronic device 120 may correspond to a body 111, an ear tip 113, at least one key button 115, and at least one sensor 117 of a first electronic device 110, respectively.

Figure 2:
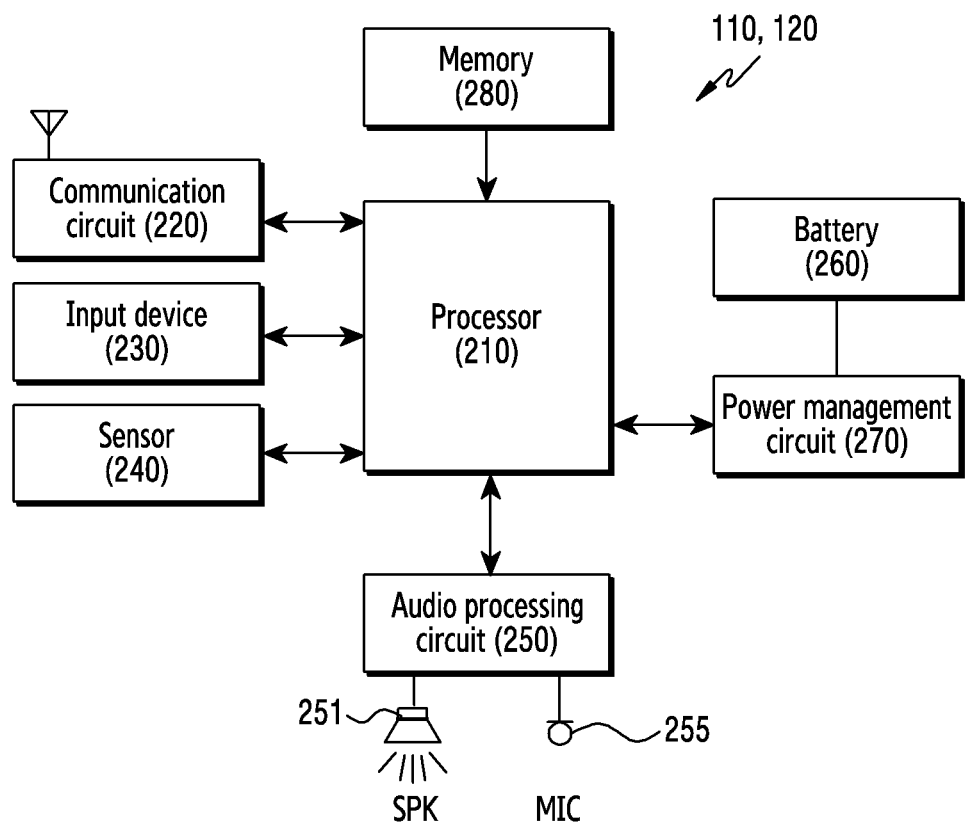
FIG. 2 is a block diagram showing an electronic device according to an embodiment of the disclosure.

FIG. 2 is a block diagram showing an electronic device (for example: a first electrode device 110 or a second electronic device 120) according to an embodiment of the disclosure. In an embodiment, the composition illustrated in FIG. 2 may be included in each of a first electronic device 110 and a second electronic device 120.

Referring to FIG. 2, each of electronic devices (for example: a first electronic device 110 and a second electronic device 120) may include a processor 210, a communication circuit 220, an input device 230, a sensor 240, an audio processing circuit 250, a speaker 251, a microphone 255, a battery 260, a power management circuit 270, a memory 280, or a combination thereof. In an embodiment, an input device 230 and a sensor 240 of FIG. 2 may correspond to at least one key button 115 or 116 and at least one sensor 117 or 118 of FIG. 1, respectively.

In an embodiment, a processor 210 may control an overall operation of an electronic device (for example: a first electronic device 110). A processor 210 may receive data of other elements (for example: a communication circuit 220, an input device 230, an audio processing circuit 250, a power management circuit 270, or a memory 280) of an electronic device (for example: a first electronic device 110), may analyze the received data, and may perform calculation according to the analyzed data.

In an embodiment, a processor 210 may control a communication circuit 220 such that an electronic device (for example: a first electronic device 110) establishes a wireless communication connection (for example: Bluetooth pairing) to an external electronic device (not shown). In an embodiment, a wireless communication connection may be a link enabling a bidirectional communication between an electronic device (for example: a first electronic device 110) and an external electronic device (not shown). In an embodiment, a processor 210 may receive data from an external electronic device (not shown) by using a communication circuit 220 and transmit a response (for example: an acknowledgment (ACK) or non-acknowledgment (NACK)) indicating whether or not the data has been successfully received from the external electronic device (not shown). In an embodiment, a wireless communication connection between a first electronic device 110 and an external electronic device (not shown) may be referred to as a first link. In an embodiment, a wireless communication connection between a second electronic device 120 and an external electronic device (not shown) may be referred to as a second link.

In an embodiment, in case that a wireless communication connection between an electronic device (for example, a first electronic device 110) and an external electronic device (not shown) is established, a processor 210 may receive data from the external electronic device (not shown) by using a communication circuit 220. In an embodiment, data received from an external electronic device (not shown) may be data including an audio signal.

In an embodiment, a processor 210 may provide data from an external electronic device (not shown) to an audio processing circuit 250. In an embodiment, an audio processing circuit 250 may convert (for example: decode) provided data into an audio signal and output the converted audio signal through a speaker 251.

In an embodiment, in case that a wireless communication connection between an electronic device (for example: a first electronic device 110) and an external electronic device (not shown) is established, a processor 210 may acquire (or identify) a wireless communication parameter for the wireless communication connection. In an embodiment, a processor 210 may store an acquired (or identified) communication parameter through a memory 280. In an embodiment, a processor 210 may transmit a communication parameter to a counterpart electronic device (for example: a second electronic device 120) via a separate wireless communication connection. In an embodiment, a wireless communication parameter related to a first link (or a second link) may include address information (for example: a Bluetooth address of a master device (for example: a first electronic device 110) of the first link (or the second link), a Bluetooth address of a user device (for example: an external electronic device (not shown)), and/or a Bluetooth address of a first electronic device (for example: the first electronic device 110)), piconet clock information (for example: clock native (CLKN) of the master device (for example: the first electronic device 110) of the first link (or the second link)), logical transport (LT) address information (for example: information allocated by the master device (for example: the first electronic device 110) of the first link (or the second link)), used channel map information, link key information, service discovery protocol (SDP) information (for example: service and/or profile information related to the first link (or the second link)), and/or supported feature information. In an embodiment, a wireless communication parameter related to a first link (or a second link) may further include an extended inquiry response (EIR) packet. In an embodiment, an EIR packet may include resource control information of a first link (or a second link) and/or information on a producer.

In an embodiment, a processor 210 may transmit a mode parameter to a counterpart electronic device (for example: a second electronic device 120) via a separate wireless communication connection. In an embodiment, a mode parameter may include information on an audio filter or a sound effect applied to an audio signal corresponding to data from an external electronic device (not shown) when the when audio signal is output through a speaker 251. In an embodiment, a mode parameter may include information on an audio output intensity or an audio output size applied to an audio signal. In an embodiment, a mode parameter may include information on the configuration of an application which is being executed in relation to data in an external electronic device (not shown). In an embodiment, a mode parameter may include information on a channel of data (for example: information on a left (L) channel and a right (R) channel in case of a stereo audio signal).

In an embodiment, a processor 210 may transmit a wireless communication connection list to a counterpart electronic device (for example: a second electronic device 120) via a separate wireless communication connection. In an embodiment, a wireless communication connection list may include a history of wireless communication connections between a plurality of external electronic devices (not shown), a wireless communication connection sequence, or a combination thereof.

In an embodiment, a wireless communication connection list stored in a memory 280 of a first electronic device 110 may be referred to as a first wireless communication connection list. In an embodiment, a wireless communication connection list stored in a memory 280 of a second electronic device 120 may be referred to as a second wireless communication connection list.

In an embodiment, a processor 210 of an electronic device (for example: a first electronic device 110) may receive a wireless communication parameter, a mode parameter, a wireless communication connection list, or a combination thereof from a counterpart electronic device (for example: a second electronic device 120) via a separate wireless communication connection.

In an embodiment, in case that a wireless communication connection between a counterpart electronic device (for example: a second electronic device 120) and an external electronic device (not shown) is established, a processor 210 of an electronic device (for example: a first electronic device 110) may receive, from the counterpart electronic device (for example: the second electronic device 120) via a separate wireless communication connection, at least a part of data from an external electronic device (not shown) (for example: data related to a channel (for example: a right (R) or left (L) channel) allocated to the second electronic device 120).

In an embodiment, a processor 210 may output, through a speaker 251, data received from a counterpart electronic device (for example: a first electronic device 110) via a separate wireless communication connection.

In an embodiment, a processor 210 of an electronic device (for example: a first electronic device 110) may monitor a wireless communication connection between a counterpart electronic device (for example: a second electronic device 120) and an external electronic device (not shown) by using a communication parameter. In an embodiment, monitoring may mean a state of attempting to receive at least a part of a packet transmitted through a wireless communication connection between a counterpart electronic device (for example: a second electronic device 120) and an external electronic device (not shown) or a state in which at least a part of a packet may be received. For example, in case that a second electronic device 120 monitors a first link, a second electronic device 120 may receive or attempt to receive, through a first link, at least a part of a packet transmitted by a user device (for example: an external electronic device (not shown)) or a first electronic device (for example: an electronic device (for example: a first electronic device 110) which has produced the first link). In this case, a user device (for example: an external electronic device (not shown)) may recognize a second electronic device 120 by using a second link, but may not recognize the existence of the second electronic device 120 through a first link. In an embodiment, a first link may refer to a wireless communication connection between a first electronic device 110 and an external electronic device (not shown). In an embodiment, a second link may refer to a wireless communication connection between a second electronic device 120 and an external electronic device (not shown).

In an embodiment, a processor 210 of an electronic device (for example: a first electronic device 110) may acquire data transmitted or received between a counterpart electronic device (for example: a second electronic device 120) and an external electronic device (not shown) via a wireless communication connection which is being monitored. In an embodiment, a processor 210 may acquire data from an external electronic device (not shown) via a wireless communication connection which is being monitored. In an embodiment, an operation in which a processor 210 acquires data from an external electronic device (not shown) via a communication circuit 220 by using a communication parameter may also be referred to as sniffing.

In an embodiment, a processor 210 may output, through a speaker 251, data acquired from an external electronic device (not shown). In an embodiment, a processor 210 may convert (decode) data acquired using an audio processing circuit 250 into an audio signal and output a converted audio signal through a speaker 251. In an embodiment, a processor 210 may output, through a speaker 251, an audio signal related to all channels (for example: an L channel and an R channel) or one channel (for example: the R channel) allocated to an electronic device (for example: a first electronic device 110) among converted audio signals, according to configuration information of the electronic device (for example: the first electronic device 110).

In an embodiment, a communication circuit 220 may establish a wireless communication connection between an electronic device (for example: a first electronic device 110) and another electronic device (for example: a counterpart electronic device (for example: a second electronic device 120) or an external electronic device (not shown)). In an embodiment, a communication circuit 220 may receive data from another electronic device (for example: a counterpart electronic device (for example: a second electronic device 120) or an external electronic device (not shown)) via an established wireless communication connection. In an embodiment, a communication circuit 220 may transmit data to another electronic device (for example: a counterpart electronic device (for example: a second electronic device 120) or an external electronic device (not shown)) via an established wireless communication connection.

In an embodiment, based on a communication parameter related to a wireless communication connection between a counterpart electronic device (for example: a second electronic device 120) and an external electronic device (not shown), a communication circuit 220 may access (or observe) a wireless communication connection between the counterpart electronic device (for example: the second electronic device 120) and the external electronic device (not shown). In an embodiment, a communication circuit 220 may acquire data transmitted or received via a wireless communication connection which is being accessed (or observed).

In an embodiment, an input device 230 may receive an input from a user. In an embodiment, an input received from a user may be an input for adjusting the volume of an audio signal output through an electronic device (for example: a first electronic device 110) or for playing a next song.

In an embodiment, an input device 230 may include a touch panel. In an embodiment, an input device 230 may detect a touch input or a hovering input by using a touch panel. In an embodiment, an input device 230 may include a physical key.

In an embodiment, an input device 230 may provide, to a processor 210, data indicating an input received from a user.

In an embodiment, a sensor 240 may produce a sensing value for identifying a communication connection event. In an embodiment, a communication connection event may include wearing an electronic device (for example: a first electronic device 110), detachment of the electronic device (for example: the first electronic device 110) from a case (for example: a case 510 of FIG. 5), the use of the electronic device (for example: the first electronic device 110), a gesture input, or a combination thereof.

In an embodiment, an audio processing circuit 250 may process a signal related to sound. In an embodiment, an audio processing circuit 250 may acquire a sound signal (for example: a user's voice signal) through a microphone 255. In an embodiment, an audio processing circuit 250 may convert a sound signal acquired through a microphone 255 into an analog audio signal (or an electrical signal) corresponding to the sound signal. In an embodiment, an audio processing circuit 250 may encode an analog audio signal into a digital audio signal by using a codec. In an embodiment, an audio processing circuit 250 may provide a digital audio signal to (an)other element(s) (for example: a processor 210, a communication circuit 220, and/or a memory 280) of an electronic device (for example: a first electronic device 110).

In an embodiment, an audio processing circuit 250 may receive a digital audio signal from (an)other element(s) (for example: a processor 210, a communication circuit 220, an interface, and/or a memory 280) of an electronic device (for example: a first electronic device 110). In an embodiment, an audio processing circuit 250 may convert a digital audio signal into an analog audio signal through a converter (for example: a digital-to-analog converter (DAC)). In an embodiment, an audio processing circuit 250 may decode a digital audio signal into an analog audio signal by using a codec. In an embodiment, an audio processing circuit 250 may output a sound signal corresponding to an analog audio signal through a speaker 251.

In an embodiment, a battery 260 may supply power to at least one element of an electronic device (for example: a first electronic device 110). In an embodiment, a battery 260 may be charged in case that an electronic device (for example: a first electronic device 110) is mounted (or connected) to a designated charging device (for example: a case (not shown)).

In an embodiment, a power management circuit 270 may manage power supplied to an electronic device (for example: a first electronic device 110) through a battery 260. For example, a power management circuit 270 may be composed as at least a part of a power management integrated circuit (PMIC).

In an embodiment, a power management circuit 270 may measure the amount of power of a battery 260 of an electronic device (for example: a first electronic device 110). In an embodiment, a power management circuit 270 may provide information on the amount of power of a battery 260 to a processor 210. In an embodiment, a processor 210 may transmit information on a remaining amount of a battery 260 of an electronic device (for example: a first electronic device 110) to an external electronic device (not shown). In an embodiment, the amount of power of a battery 260 of an electronic device (for example: a first electronic device 110) may be used to allow the electronic device (for example: the first electronic device 110) to perform negotiations related to a counterpart electronic device (for example: a second electronic device 120) and a master device. In an embodiment, based on the amounts of power of an electronic device (for example: a first electronic device 110) and a counterpart electronic device (for example: a second electronic device 120), one electronic device among the electronic device (for example: the first electronic device 110) and the counterpart electronic device (for example: the second electronic device 120) may be determined as a master device, and the other electronic device may be determined as a slave device.

Figure 3:
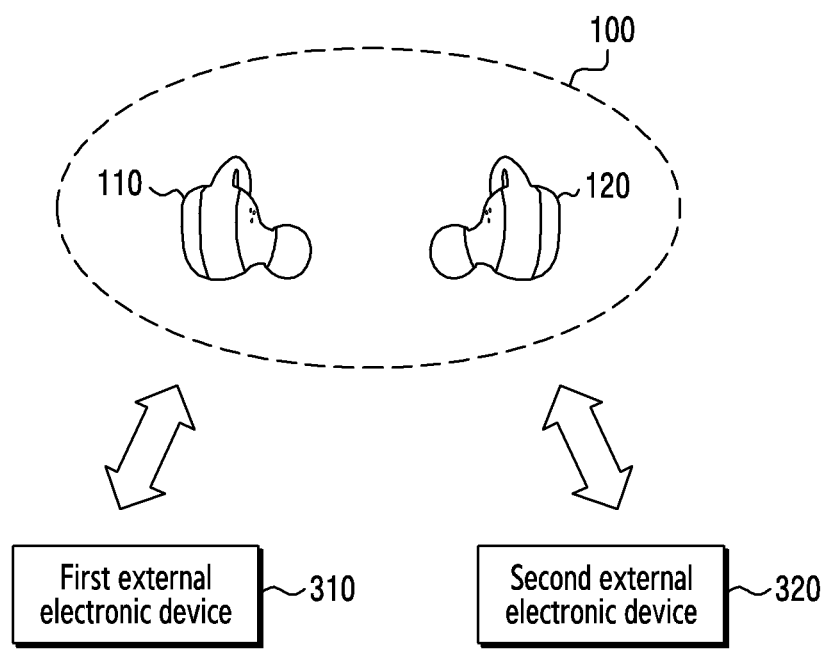
FIG. 3 is a block diagram showing an electronic device in a network environment according to an embodiment of the disclosure.

FIG. 3 is a block diagram showing electronic devices (for example: a first electronic device 110 and a second electronic device 120) in a network environment according to an embodiment of the disclosure.

Figure 4:
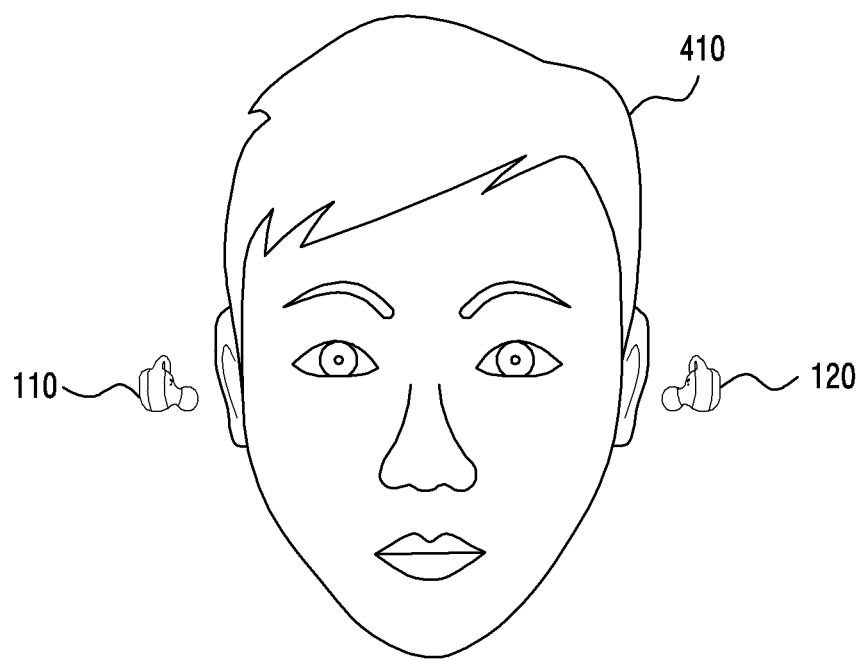
FIG. 4 exemplifies a situation where a communication connection event of an electronic device is identified, according to an embodiment of the disclosure.

FIG. 4 exemplifies a situation where a communication connection event of an electronic device (for example: a first electronic device 110 or a second electronic device 120) is identified, according to an embodiment of the disclosure.

Figure 5:
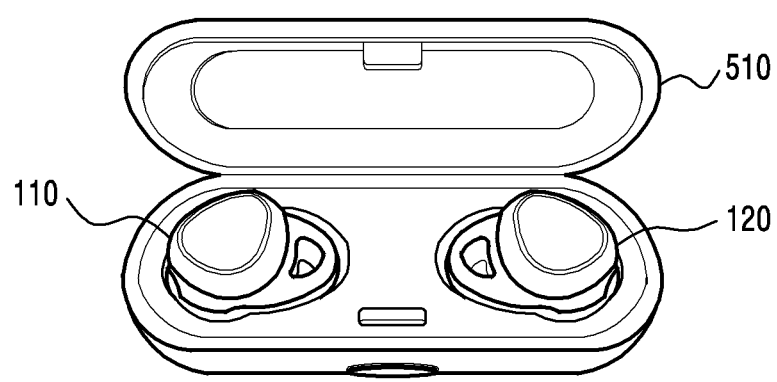
FIG. 5 exemplifies a situation where a communication connection event of an electronic device is identified, according to an embodiment of the disclosure.

FIG. 5 exemplifies a situation where a communication connection event of an electronic device (for example: a first electronic device 110 or a second electronic device 120) is identified, according to an embodiment of the disclosure. FIGS. 3 to 5 may be described with reference to the configurations of FIGS. 1 and 2.

Referring to FIG. 3, electronic devices (for example: a first electronic device 110 and a second electronic device 120) which constitute an electronic device set 100 may establish a wireless communication connection to each other. In an embodiment, at least one electronic device (for example: a first electronic device 110) which has identified a communication connection event may request a wireless communication connection to a counterpart electronic device (for example: a second electronic device 120), such that the electronic devices (for example: the first electronic device 110 and the second electronic device 120) may establish a wireless communication connection to each other. In an embodiment, based on a sensing value of a sensor 240, a communication connection event may be identified by a processor 210. In an embodiment, a communication connection event may include wearing an electronic device (for example: a first electronic device 110), detachment of the electronic device (for example: the first electronic device 110) from a case 510, the use of the electronic device (for example: the first electronic device 110), a gesture input, or a combination thereof. In an embodiment, a communication connection event may be an event for selecting one electronic device from among electronic devices (for example: a first electronic device 110 and a second electronic device 120) and performing, based on the selected electronic device, a communication connection to an external electronic device.

In an embodiment, when a wireless communication connection between electronic devices (for example: a first electronic device 110 and a second electronic device 120) is established, the electronic devices (for example: the first electronic device 110 and the second electronic device 120) may select a master device (for example: the first electronic device 110) and a slave device (for example: the second electronic device 120) through negotiations with each other. In an embodiment, based on a predesignated criterion (for example: the amount of power), electronic devices (for example: a first electronic device 110 and a second electronic device 120) may select a master device (for example: the first electronic device 110) and a slave device (for example: the second electronic device 120). In an embodiment, electronic devices (for example: a first electronic device 110 and a second electronic device 120) may change a master device and a slave device even after selecting the master device and the slave device. In an embodiment, after a master device and a slave device are selected, the master device may be changed to the slave device, based on a predesignated criterion (for example: the amount of power). In an embodiment, in case that a master device is changed to a new slave device, a slave device may be changed to a new master device.

In an embodiment, at least one electronic device (for example: a first electronic device 110) among electronic devices (for example: the first electronic device 110 and a second electronic device 120) may establish a wireless communication connection to an external electronic device (for example: a first external electronic device 310 or a second external electronic device 320). In an embodiment, a master device (for example: a first electronic device 110) among electronic devices (for example: a first electronic device 110 and a second electronic device 120) may establish a wireless communication connection to an external electronic device (for example: a first external electronic device 310 and a second external electronic device 320). In an embodiment, an external electronic device (for example: a first external electronic device 310 or a second external electronic device 320) may be an electronic device which has a history of establishing a wireless communication connection to a master electronic device (for example: a first electronic device 110).

In an embodiment, when a communication connection event is identified, at least one electronic device (for example: a first electronic device 110) may establish a wireless communication connection to at least one external electronic device (for example: a first external electronic device 310) among external electronic devices. In an embodiment, based on a sensing value of a sensor 240, a communication connection event may be identified by a processor 210. In an embodiment, a communication connection event may include wearing an electronic device (for example: a first electronic device 110), detachment of the electronic device (for example: the first electronic device 110) from a case 510, the use of the electronic device (for example: the first electronic device 110), a gesture input, or a combination thereof.

Referring to FIG. 4, a user 410 may wear electronic devices (for example: a first electronic device 110 and a second electronic device 120) on the auricle of his/her ear. In an embodiment, a user 410 may first wear a first electronic device 110 on the auricle of his/her right ear and then wear a second electronic device 120 on the auricle of his/her left ear. In an embodiment, a first electronic device 110 may identify a communication connection event that is wearing an electronic device by using a sensing value of a sensor 240. In an embodiment, a second electronic device 120 may identify a communication connection event that is wearing an electronic device by using a sensing value of a sensor 240. In an embodiment, according to the sequence of wearing electronic devices (for example: a first electronic device 110 and a second electronic device 120) by a user 410, the first electronic device 110 may identify a communication connection event prior to a second electronic device 120.

Referring to FIG. 5, a user may separate electronic devices (for example: a first electronic device 110 and a second electronic device 120) from a case 510. In an embodiment, a user may first separate a first electronic device 110 from a case 510 and then separate a second electronic device 120 from the case 510. In an embodiment, a first electronic device 110 may identify a communication connection event that is detachment of an electronic device by using a sensing value of a sensor 240. In an embodiment, a second electronic device 120 may identify a communication connection event that is detachment of an electronic device by using a sensing value of a sensor 240. In an embodiment, according to the sequence of separating electronic devices (for example: a first electronic device 110 and a second electronic device 120) by a user, the first electronic device 110 may identify a communication connection event prior to the second electronic device 120. However, this is merely an example. In an embodiment, a user may separate electronic devices (for example: a first electronic device 110 and a second electronic device 120) electrically connected to a charging terminal (not shown) of a charger (not shown). In an embodiment, a user may first separate a first electronic device 110 from a charging terminal (not shown) of a charger (not shown) and then separate a second electronic device 120 from a case 510. In an embodiment, a first electronic device 110 may identify a communication connection event that is separation of an electronic device by using a sensing value of a sensor 240. In an embodiment, a second electronic device 120 may identify a communication connection event that is separation of an electronic device by using a sensing value of a sensor 240. In an embodiment, according to the sequence of separating electronic devices (for example: a first electronic device 110 and a second electronic device 120) by a user, the first electronic device 110 may identify a communication connection event prior to the second electronic device 120.

In an embodiment, electronic devices (for example: a first electronic device 110 and a second electronic device 120) which constitute an electronic device set 100 may determine a wireless communication connection sequence. In an embodiment, based on a wireless communication connection list stored in a memory 280, electronic devices (for example: a first electronic device 110 and a second electronic device 120) may determine a wireless communication connection sequence. In an embodiment, a wireless communication connection list stored in a memory 280 of a first electronic device 110 may be referred to as a first wireless communication connection list. In an embodiment, a wireless communication connection list stored in a memory 280 of a second electronic device 120 may be referred to as a second wireless communication connection list. In an embodiment, a wireless communication connection list may include a wireless communication connection sequence between a plurality of external electronic devices (not shown).

In an embodiment, based on a wireless communication connection list of a primary device among electronic devices (for example: a first electronic device 110 and a second electronic device 120), a master device among the electronic devices (for example: the first electronic device 110 and the second electronic device 120) may determine a wireless communication connection sequence. In an embodiment, a primary device may be an electronic device in which a communication connection event has been identified among electronic devices (for example: a first electronic device 110 and a second electronic device 120). In an embodiment, a primary device may be an electronic device in which a communication connection event is first identified among electronic devices (for example: a first electronic device 110 and a second electronic device 120). In an embodiment, a counterpart electronic device (for example: a second electronic device 120) of a primary device (for example: an electronic device 110) may be a secondary device. In an embodiment, a master device and a primary device may be the same electronic device or different electronic devices.

In an embodiment, based on a wireless communication connection sequence according to a wireless communication connection list of a primary device, a master device (for example: a first electronic device 110) may identify an external electronic device (for example: a first external electronic device 310) for which a wireless communication connection is to be established among external electronic devices (for example: a first external electronic device 310 and a second external electronic devices 320).

In an embodiment, a master device (for example: a first electronic device 110) may establish a wireless communication connection to an identified external electronic device (for example: a first external electronic device 310).

In an embodiment, in case that a wireless communication connection to an identified external electronic device (for example: a first external electronic device 310) is not established, a master device (for example: a first electronic device 110) may identify, based on a wireless communication connection sequence, a next external electronic device (for example: a second external electronic device 320) for which a wireless communication connection is to be established.

In an embodiment, in case that a wireless communication connection to at least one external electronic device among external electronic devices included in a determined wireless communication connection list is not established, a master device (for example: a first electronic device 110) may establish, based on a wireless communication connection list of a secondary device (for example: a second electronic device 120), a wireless communication connection. In an embodiment, establishing, based on a wireless communication connection list of a secondary device (for example: a second electronic device 120), a wireless communication connection may include: determining, based on the communication connection list of the secondary device (for example: the second electronic device 120), a wireless communication connection sequence; identifying, based on a wireless communication connection sequence, an external electronic device for which a wireless communication connection is to be established; and establishing a wireless communication connection to the identified external electronic device. In an embodiment, establishing, based on a wireless communication connection list of a secondary device (for example: a second electronic device 120), a wireless communication connection may include, in case that a wireless communication connection to an external electronic device identified based on the wireless communication connection list of the secondary device (for example: the second electronic device 120) is not established, establishing, based on a wireless communication connection sequence based on the wireless communication connection list of the secondary device (for example: the second electronic device 120), a wireless communication connection to a next external electronic device.

In an embodiment, at least one electronic device (for example: a first electronic device 110) among electronic devices (for example: the first electronic device 110 and a second electronic device 120) which constitute an electronic device set 100 may establish a wireless communication connection to an external electronic device (for example: a first external electronic device 310 or a second external electronic device 320). In an embodiment, a master device (for example: a first electronic device 110) among electronic devices (for example: a first electronic device 110 and a second electronic device 120) may establish a wireless communication connection to an external electronic device (for example: a first external electronic device 310 and a second external electronic device 320). In an embodiment, a master device (for example: a first electronic device 110) may refer to a device which establishes a wireless communication connection to an external electronic device (for example: a first external electronic device 310 or a second external electronic device 320). In an embodiment, a counterpart electronic device (for example: a second electronic device 120) of a master device (for example: a first electronic device 110) may be referred to as a slave device. In an embodiment, based on a predetermined criterion (for example: the amount of power), a master device may be determined among electronic devices (for example: a first electronic device 110 and a second electronic device 120). In an embodiment, based on a predetermined criterion (for example: the amount of power), a master device may be changed to a slave device. In an embodiment, in case that a master device is changed to a new slave device, a slave device may be changed to a new master device.

Figure 6:
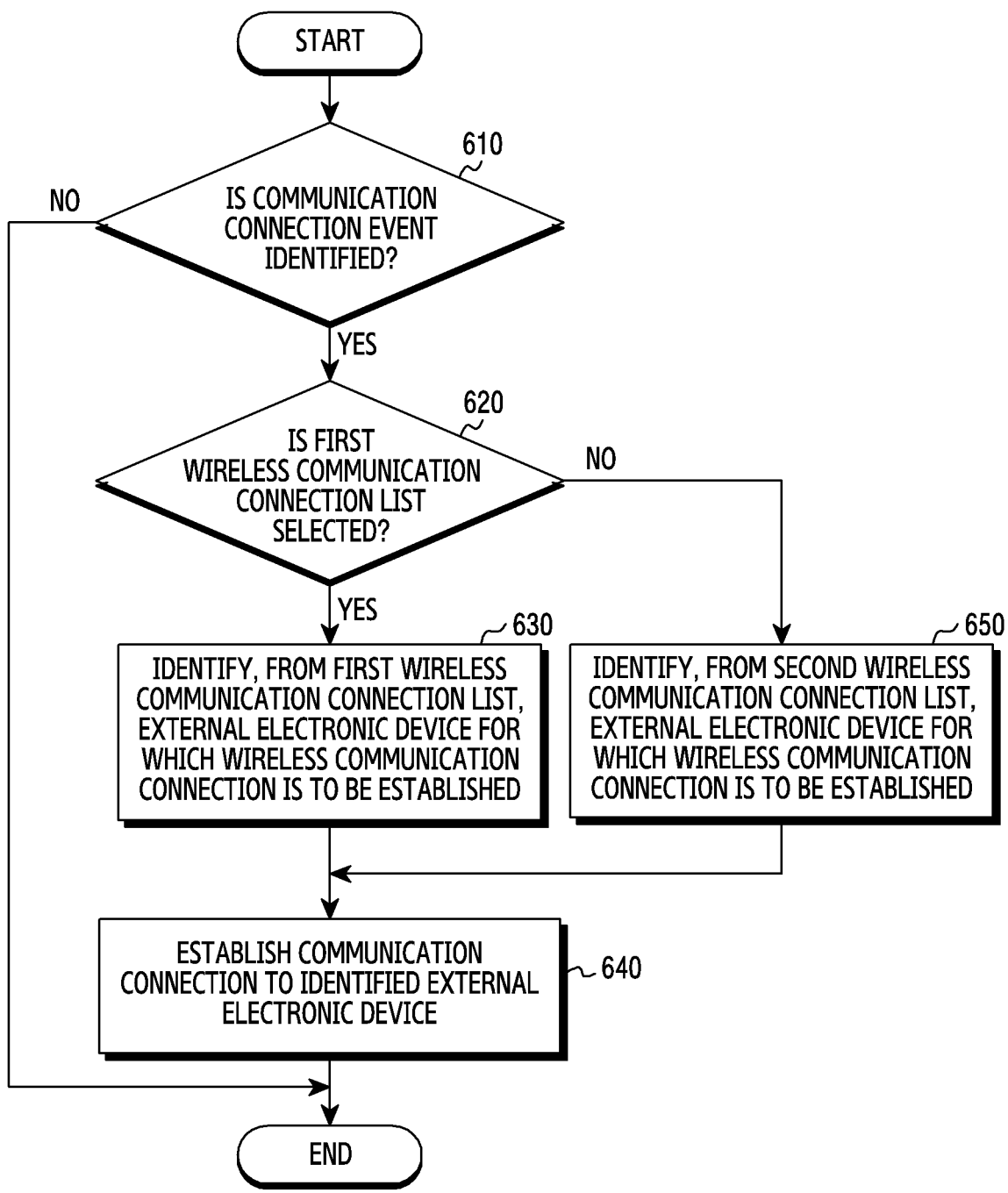
FIG. 6 is a flowchart showing a communication connection operation of an electronic device according to an embodiment of the disclosure.

FIG. 6 is a flowchart showing a communication connection operation of an electronic device set according to an embodiment of the disclosure. FIG. 6 may be described with reference to the configurations of FIGS. 1 and 2.

Operations of FIG. 6 may be performed by a master device (for example: a first electronic device 110) among electronic devices (for example: the first electronic device 110 and a second electronic device 120) which constitute an electronic device set 100. In an embodiment, a master device may be in a state predetermined through negotiations between electronic devices (for example: a first electronic device 110 and a second electronic device 120) which constitute an electronic device set 100. In an embodiment, based on the amount of power of a battery 260 of each of electronic devices (for example: a first electronic device 110 and a second electronic device 120), the electronic devices (for example: the first electronic device 110 and the second electronic device 120) may determine a master device. In an embodiment, based on a communication connection event identification sequence of each of electronic devices (a first electronic device 110 and a second electronic device 120), the electronic devices (for example: the first electronic device 110 and the second electronic device 120) may determine a master device. In an embodiment, before operations of FIG. 6 are performed, electronic devices (for example: a first electronic device 110 and a second electronic device 120) which constitute an electronic device set 100 may establish a wireless communication connection to each other. In an embodiment, at least one electronic device (for example: a first electronic device 110) may request a wireless communication connection to a counterpart electronic device (for example: a second electronic device 120), such that the electronic devices (for example: the first electronic device 110 and the second electronic device 120) may establish a wireless communication connection to each other. In an embodiment, when a wireless communication connection between electronic devices (for example: a first electronic device 110 and a second electronic device 120) is established, the electronic devices (for example: the first electronic device 110 and the second electronic device 120) may select a master device (for example: the first electronic device 110) and a slave device (for example: the second electronic device 120) through negotiations with each other.

Referring to FIG. 6, in operation 610, a master device (for example: a first electronic device 110) of an electronic device set 100 may identify a communication connection event. In an embodiment, a master device (for example: a first electronic device 110) may identify, based on a sensing value produced through an own sensor thereof, a communication connection event or identify, based on a sensing value produced through a sensor of a slave device (for example: a second electronic device 120), a communication connection event. In an embodiment, a slave device (for example: a second electronic device 120) may identify, based on a sensing value produced through an own sensor thereof, a communication connection event, and transmit, to a master device (for example: a first electronic device 110), the identification of the communication connection event. In an embodiment, based on a signal indicating that a communication connection event of a slave device (for example, a second electronic device 120) has been identified, a master device (for example: a first electronic device 110) may identify production of a communication connection event.

Referring to FIG. 6, in operation 620, a master device (for example: a first electronic device 110) of an electronic device set 100 may determine whether to select a first wireless communication connection list among the first wireless communication connection list and a second wireless communication connection list. In an embodiment, a first wireless communication connection list may be a wireless communication connection list stored in a memory 280 of a first electronic device 110. In an embodiment, a second wireless communication connection list may be a wireless communication connection list stored in a memory 280 of a second electronic device 120. In an embodiment, a first electronic device 110 of an electronic device set 100 may share an own first wireless communication connection list thereof with a second electronic device 120. In an embodiment, a second electronic device 120 of an electronic device set 100 may share an own second wireless communication connection list thereof with a first electronic device 110. In an embodiment, a wireless communication connection may be shared at a point in time when a wireless communication connection list is produced, a point in time when a wireless communication connection list is renewed, a point in time when a sharing request for a wireless communication connection list is received, a point in time when a communication connection event is identified, at a point in time requested by a master device (for example: a first electronic device 110), a point in time when a primary device is determined, or a point in time of a combination thereof.

In an embodiment, each of a first wireless communication connection list and a second wireless communication connection list may include a wireless communication connection sequence between multiple external electronic devices (not shown). In an embodiment, at least some of multiple external electronic devices (not shown) included in a first wireless communication connection list may also be included in a second wireless communication connection list. In an embodiment, at least some of multiple external electronic devices (not shown) included in a second wireless communication connection list may also be included in a first wireless communication connection list. In an embodiment, the connection priorities of at least some of external electronic devices included in both a first wireless communication connection list and a second wireless communication connection list among multiple external electronic devices (not shown) may be different from each other in the first wireless communication connection list and the second wireless communication connection list. In an embodiment, the connection priorities of at least some of external electronic devices included in both a first wireless communication connection list and a second wireless communication connection list among multiple external electronic devices (not shown) may be identical to each other in the first wireless communication connection list and the second wireless communication connection list.

In an embodiment, in case that a first electronic device 110 is a primary device, a master device (for example: the first electronic device 110) may determine to select a first wireless communication connection list. In an embodiment, in case that a slave device (for example: a second electronic device 120) is a primary device, a master device (for example: a first electronic device 110) may determine to select a second wireless communication connection list. In an embodiment, a primary device may be an electronic device in which a communication connection event is first identified among electronic devices (for example: a first electronic device 110 and a second electronic device 120). In an embodiment, an electronic device in which a sensing value for identifying a communication connection event is first produced among electronic devices (for example: a first electronic device 110 and a second electronic device 120) may be determined as a primary device. In an embodiment, a counterpart electronic device (for example: a second electronic device 120) of a primary device (for example: a first electronic device 110) may be a secondary device.

Referring to FIG. 6, in operation 620, in case that it is determined to select a first wireless communication connection list (determined as "Yes"), a master device (for example: a first electronic device 110) may perform operation 630. Referring to FIG. 6, in operation 620, in case that it is determined to select a second wireless communication connection list (determined as "No"), a master device (for example: a first electronic device 110) may perform operation 650.

Referring to FIG. 6, in operation 630, based on a first wireless communication connection list, a master device (for example: a first electronic device 110) may identify an external electronic device for which a wireless communication connection is to be established. In an embodiment, a master device (for example: a first electronic device 110) may identify an external electronic device having a first priority in a first wireless communication connection list as an external electronic device for which a wireless communication connection is to be established.

Referring to FIG. 6, in operation 640, a master device (for example: a first electronic device 110) may establish a wireless communication connection to an identified external electronic device.

Referring to FIG. 6, in operation 650, based on a second wireless communication connection list, a master device (for example: a first electronic device 110) may identify an external electronic device for which a wireless communication connection is to be established. In an embodiment, a master device (for example: a first electronic device 110) may identify an external electronic device having a first priority in a second wireless communication connection list as an external electronic device for which a wireless communication connection is to be established.

Figure 7:
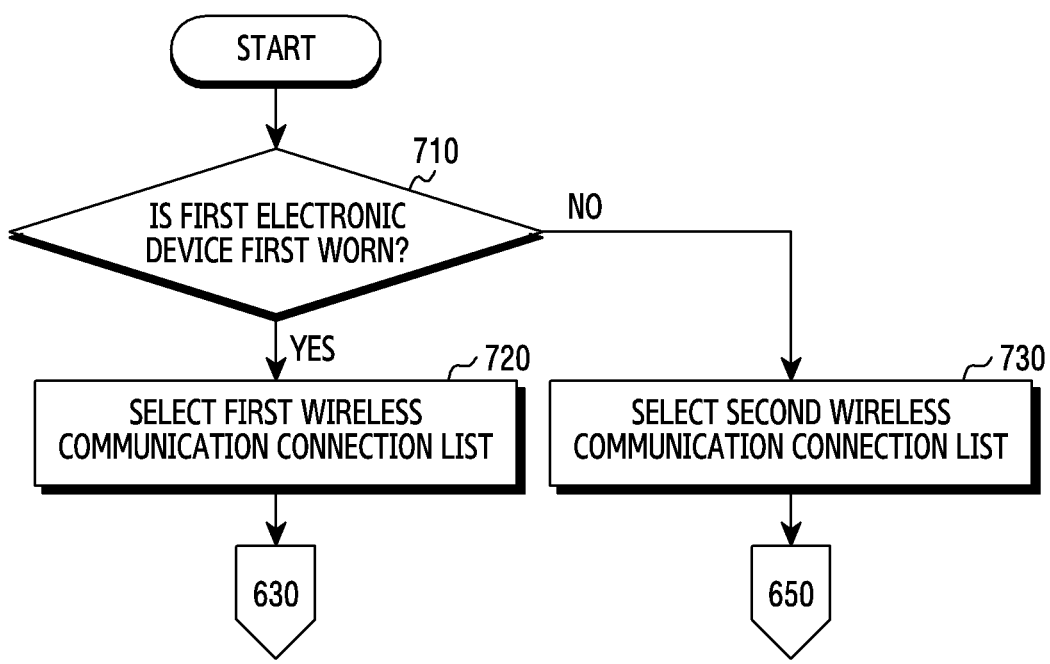
FIG. 7 is a flowchart showing an operation of determining a wireless communication connection list of an electronic device set, according to an embodiment of the disclosure.

FIG. 7 is a flowchart showing an operation of determining a wireless communication connection list of an electronic device set, according to an embodiment of the disclosure. Operations 710 to 730 of FIG. 7 may be included in operations 610 and 620 of FIG. 6. FIG. 7 may be described with reference to the configurations of FIGS. 1 and 2.

Operations of FIG. 7 may be performed by a master device (for example: a first electronic device 110) among electronic devices (for example: the first electronic device 110 and a second electronic device 120) which constitute an electronic device set 100.

Referring to FIG. 7, a master device (for example: a first electronic device 110) of an electronic device set 100 may perform operation 610 of FIG. 6 and then perform operation 710 of FIG. 7.

Referring to FIG. 7, in operation 710, based on a sensing value of each of electronic devices (for example: a first electronic device 110 and a second electronic device 120), a master device (for example: the first electronic device 110) of an electronic device set 100 may identify whether or not the first electronic device 110 is first worn.

Referring to FIG. 7, in operation 710, in case that it is identified that a first electronic device 110 is first worn (determined as "Yes"), a master device (for example: the first electronic device 110) may perform operation 720. Referring to FIG. 7, in operation 710, in case that it is identified that that a slave device (for example: a second electronic device 120) is first worn (determined as "No"), a master device (for example: a first electronic device 110) may perform operation 730.

Referring to FIG. 7, in operation 720, a master device (for example: a first electronic device 110) may select a first wireless communication connection list. Thereafter, the master device (for example: the first electronic device 110) may perform operation 630 of FIG. 6.

Referring to FIG. 7, in operation 730, a master device (for example: a first electronic device 110) may select a second wireless communication connection list. Thereafter, the master device (for example: the first electronic device 110) may perform operation 650 of FIG. 6.

Figure 8:
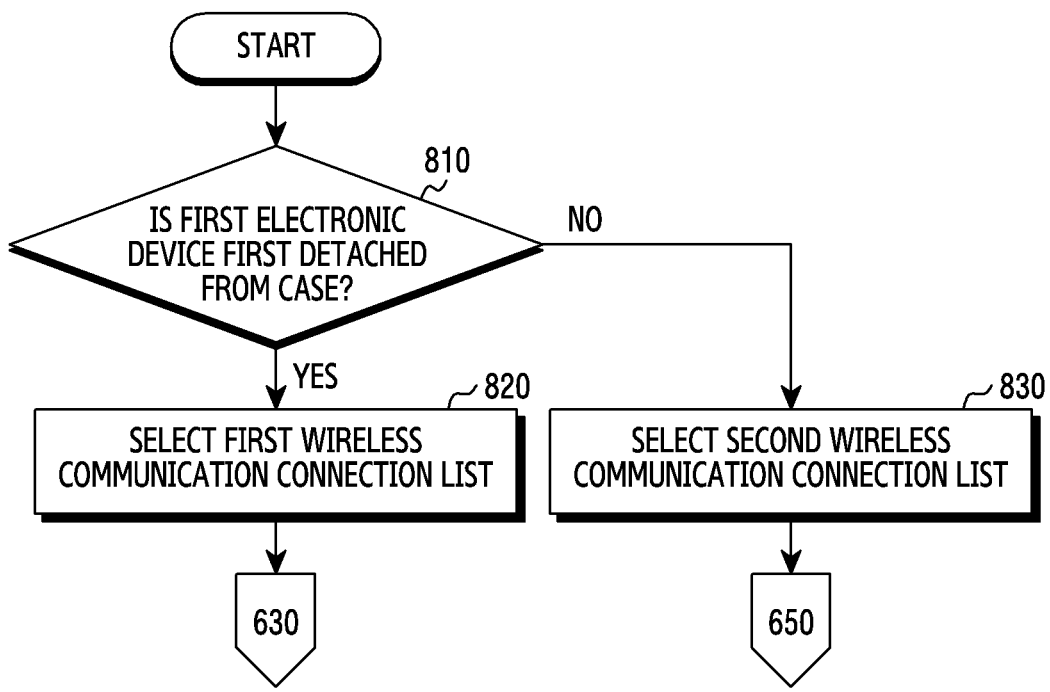
FIG. 8 is a flowchart showing an operation of determining a wireless communication connection list of an electronic device set, according to an embodiment of the disclosure.

FIG. 8 is a flowchart showing an operation of determining a wireless communication connection list of an electronic device set, according to an embodiment of the disclosure. Operations 810 to 830 of FIG. 8 may be included in operations 610 and 620 of FIG. 6. FIG. 8 may be described with reference to the configurations of FIGS. 1 and 2.

Operations of FIG. 8 may be performed by a master device (for example: a first electronic device 110) among electronic devices (for example: the first electronic device 110 and a second electronic device 120) which constitute an electronic device set 100.

Referring to FIG. 8, a master device (for example: a first electronic device 110) of an electronic device set 100 may perform operation 610 of FIG. 6 and then perform operation 810 of FIG. 8.

Referring to FIG. 8, in operation 810, based on a sensing value of each of electronic devices (for example: a first electronic device 110 and a second electronic device 120), a master device (for example: the first electronic device 110) of an electronic device set 100 may identify whether or not the first electronic device 110 is first detached from a case (for example: a case 510 of FIG. 5). In an embodiment, in case that a state of electronic devices (for example: a first electronic device 110 and a second electronic device 120) of an electronic device set 100 is changed from a charging state to another state (for example: a using state or a communicable state), a master device (for example: the first electronic device 110) may identify that the electronic devices (for example: the first electronic device 110 and the second electronic device 120) are detached from a case 510 (for example: a case 510 of FIG. 5).

Referring to FIG. 8, in operation 810, in case that it is identified that a first electronic device 110 is first detached from a case (for example: a case 510 of FIG. 5) (determined as "Yes"), a master device (for example: the first electronic device 110) may perform operation 820. Referring to FIG. 8, in operation 810, in case that it is identified that a second electronic device 120 is first detached from a case (for example: a case 510 of FIG. 5) (determined as "No"), a master device (for example: a first electronic device 110) may perform operation 830.

Referring to FIG. 8, in operation 820, a master device (for example: a first electronic device 110) may select a first wireless communication connection list. Thereafter, the master device (for example: the first electronic device 110) may perform operation 630 of FIG. 6.

Referring to FIG. 8, in operation 830, a master device (for example: a first electronic device 110) may select a second wireless communication connection list. Thereafter, the master device (for example: the first electronic device 110) may perform operation 650 of FIG. 6.

Figure 9:
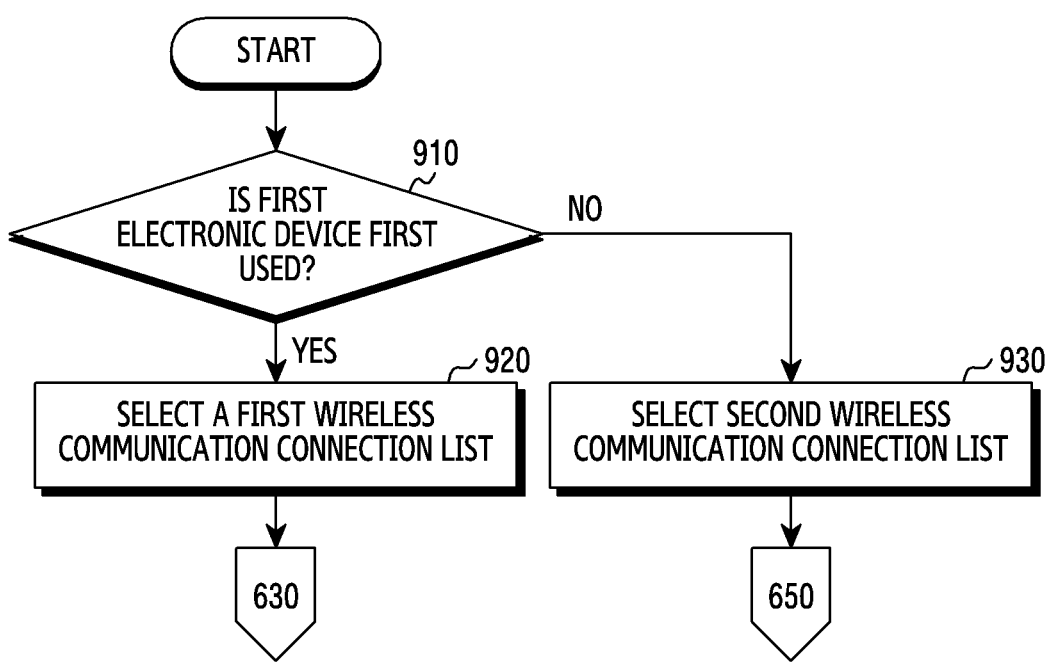
FIG. 9 is a flowchart showing an operation of determining a wireless communication connection list of an electronic device set, according to an embodiment of the disclosure.

FIG. 9 is a flowchart showing an operation of determining a wireless communication connection list of an electronic device set, according to an embodiment of the disclosure. Operations 910 to 930 of FIG. 9 may be included in operations 610 and 620 of FIG. 6. FIG. 9 may be described with reference to the configurations of FIGS. 1 and 2.

Operations of FIG. 9 may be performed by a master device (for example: a first electronic device 110) among electronic devices (for example: the first electronic device 110 and a second electronic device 120) which constitute an electronic device set 100.

Referring to FIG. 9, a master device (for example: a first electronic device 110) of an electronic device set 100 may perform operation 610 of FIG. 6 and then perform operation 910 of FIG. 9.

Referring to FIG. 9, in operation 910, based on a sensing value of each of electronic devices (for example: a first electronic device 110 and a second electronic device 120), a master device (for example: a first electronic device 110) of an electronic device set 100 may identify whether or not the first electronic device 110 is first used. In an embodiment, in case that a user applies an input (for example: a touch input or a hovering input) through an input device 230 of a first electronic device 110 (or a second electronic device 120), the first electronic device 110 (or the second electronic device 120) may identify that the first electronic device 110 (or the second electronic device 120) is to be used.

Referring to FIG. 9, in operation 910, in case that it is identified that a first electronic device 110 is first used (determined as "Yes"), a master device (for example: a first electronic device 110) may perform operation 920. Referring to FIG. 9, in operation 910, in case that it is identified that a second electronic device 120 is first used (determined as "No"), a master device (for example: a first electronic device 110) may perform operation 930.

Referring to FIG. 9, in operation 920, a master device (for example: a first electronic device 110) may select a first wireless communication connection list. Thereafter, the master device (for example: the first electronic device 110) may perform operation 630 of FIG. 6.

Referring to FIG. 9, in operation 930, a master device (for example: a first electronic device 110) may select a second wireless communication connection list. Thereafter, the master device (for example: the first electronic device 110) may perform operation 650 of FIG. 6.

Figure 10:
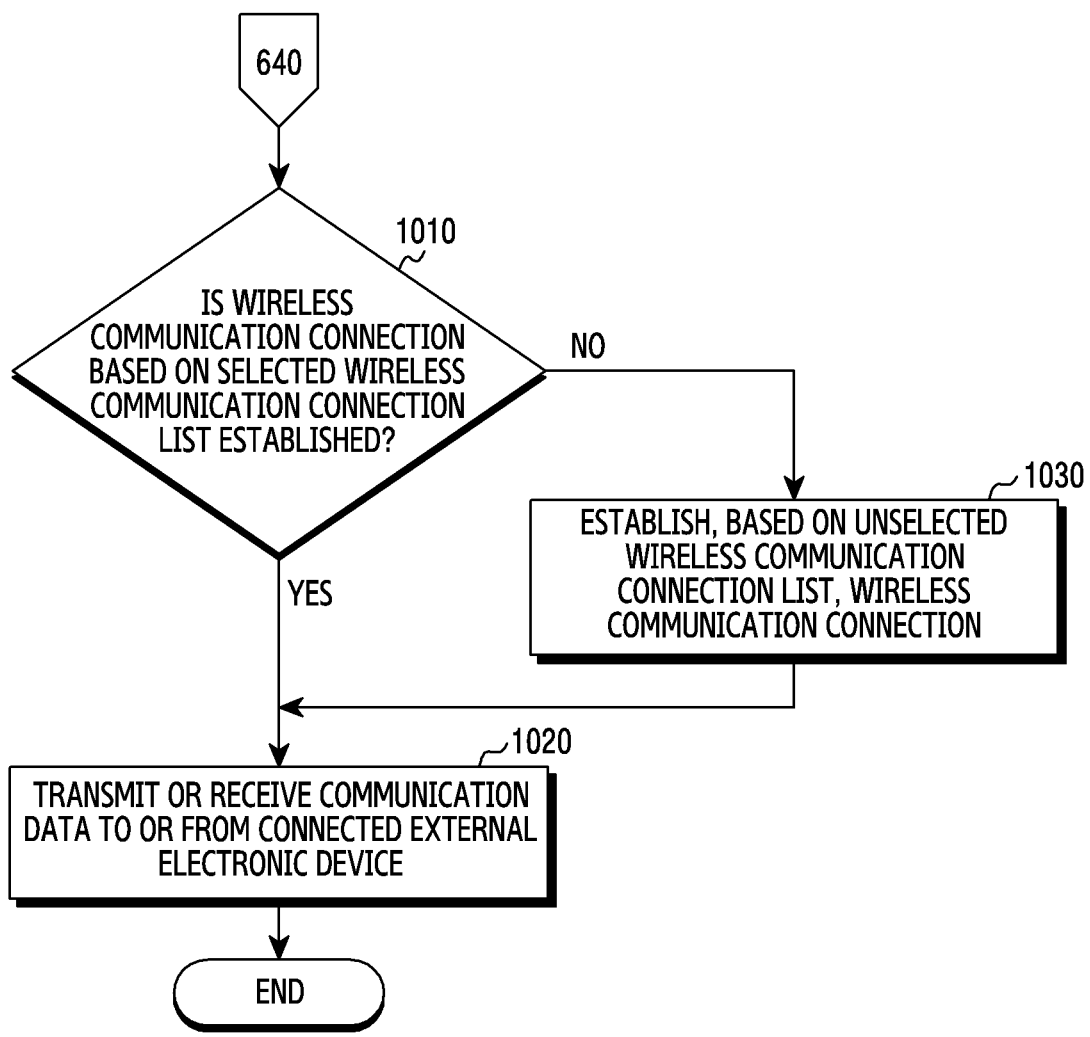
FIG. 10 is a flowchart showing an operation of changing a wireless communication connection list of an electronic device set, according to an embodiment of the disclosure.

FIG. 10 is a flowchart showing an operation of changing a wireless communication connection list of an electronic device set, according to an embodiment of the disclosure. FIG. 10 may be described with reference to the configurations of FIGS. 1 and 2.

Operations of FIG. 10 may be performed by a master device (for example: a first electronic device 110) among electronic devices (for example: the first electronic device 110 and a second electronic device 120) which constitute an electronic device set 100.

Referring to FIG. 10, a master device (for example: a first electronic device 110) of an electronic device set 100 may perform operation 640 of FIG. 6 and then perform operation 1010 of FIG. 10.

Referring to FIG. 10, in operation 1010, based on a determined wireless communication connection list, a master device (for example: a first electronic device 110) may identify whether or not a wireless communication connection is established.

In an embodiment, a master device (for example: a first electronic device 110) may identify whether or not a wireless communication connection to external electronic devices (for example: a first external electronic device 310 and a second external electronic device 320 of FIG. 3) included in a wireless communication connection list determined via operation 620 of FIG. 6 is established.

Referring to FIG. 10, in operation 1010, in case that a wireless communication connection is established based on a wireless communication connection list (determined as "Yes"), a master device (for example: a first electronic device 110) may perform operation 1020. Referring to FIG. 10, in operation 1010, in case that a wireless communication connection is not established based on a wireless communication connection list (determined as "No"), a master device (for example: a first electronic device 110) may perform operation 1030.

Referring to FIG. 10, in operation 1020, a master device (for example: a first electronic device 110) may transmit or receive communication data to or from a connected external electronic device. In an embodiment, a master device (for example: a first electronic device 110) may receive communication data indicating a sound source from a connected external electronic device.

Referring to FIG. 10, in operation 1030, a master device (for example: a first electronic device 110) may establish, based on another wireless communication connection list, a wireless communication connection. In an embodiment, another wireless communication connection list may be a wireless communication connection list which has not been selected via operation 620 of FIG. 6.

In an embodiment, operation 1030 may be the performance of operations 640 and 650 of FIG. 6. For example, in case that a wireless communication connection to an external electronic device identified based on a first wireless communication connection list is not established, a master device (for example: a first electronic device 110) may perform a wireless communication connection to an external electronic device identified based on a second wireless communication connection list. In an embodiment, when a wireless communication connection to an external electronic device is established via operation 1030, a master device (for example: a first electronic device 110) may perform operation 1020.

Figure 11:
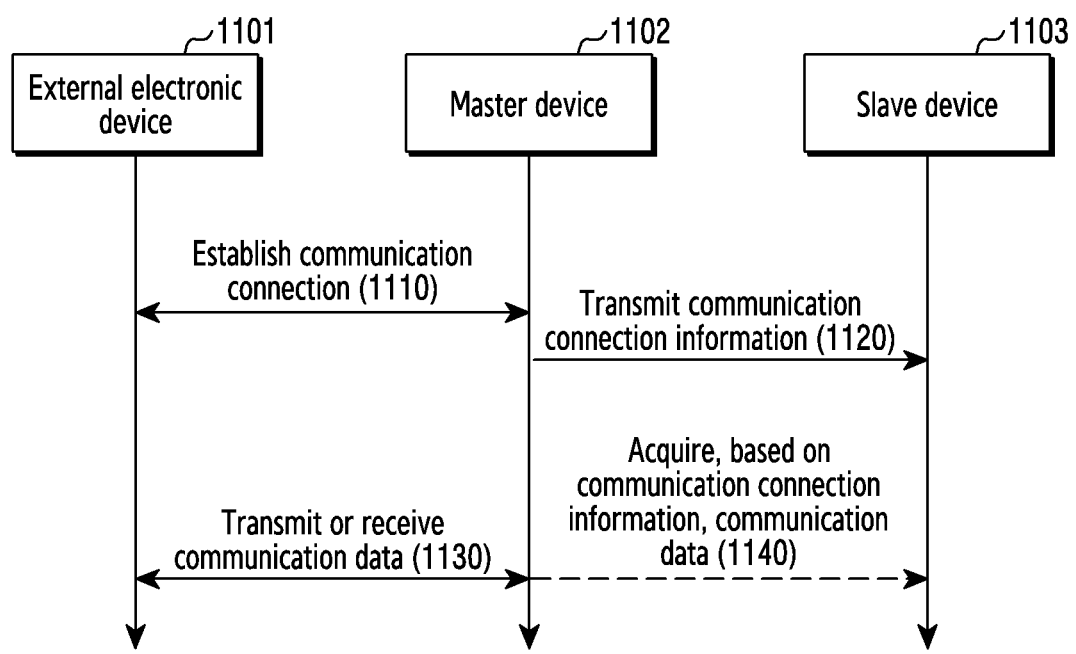
FIG. 11 is a flowchart showing a communication connection operation of an electronic device set according to an embodiment of the disclosure.

FIG. 11 is a flowchart showing a communication connection operation of an electronic device set according to an embodiment of the disclosure. FIG. 11 may be described with reference to the configurations of FIGS. 1 and 2. In an embodiment, a master device 1102 may correspond to a first electronic device 110. In an embodiment, a slave device 1103 may correspond to a second electronic device 120.

In an embodiment, a master device 1102 and a slave device 1103 may be in a state where a wireless communication connection to each other is established. In an embodiment, a master device 1102 and a slave device 1103 may be in a state of being determined as a primary device and a secondary device via sharing of a situation (for example: sharing of a communication connection event) with each other.

Referring to FIG. 11, in operation 1110, a master device 1102 may establish a wireless communication connection to an external electronic device 1101. In an embodiment, an external electronic device 1101 may be an external electronic device included in a wireless communication connection list determined in operation 620 of FIG. 6.

Referring to FIG. 11, in operation 1120, a master device 1102 may transmit communication connection information to a slave device 1103. In an embodiment, communication connection information may be a wireless communication parameter. In an embodiment, a wireless communication parameter may include identification information of an external electronic device 1101, identification information of a master device 1102, channel information of a wireless communication connection, or a combination thereof. In an embodiment, a wireless communication parameter may include address information (for example: a r address of a master device 1102 of a wireless communication connection and/or a Bluetooth address of an external electronic device 1101), piconet clock information (for example: clock native (CLKN) of the master device 1102 of the wireless communication connection), logical transport (LT) address information (for example: information allocated by the master device 1102 of the wireless communication connection), used channel map information, link key information, service discovery protocol (SDP) information (for example: service and/or profile information related to the wireless communication connection), and/or supported feature information. In an embodiment, a wireless communication parameter related to a wireless communication connection may further include an extended inquiry response (EIR) packet. In an embodiment, an EIR packet may include resource control information of a wireless communication connection and/or information on a producer.

Referring to FIG. 11, in operation 1130, a master device 1102 may transmit or receive communication data to or from an external electronic device 1101. In an embodiment, a master device 1102 may receive communication data indicating a sound source from a connected external electronic device 1101.

Referring to FIG. 11, in operation 1140, a slave device 1103 may acquire communication data transmitted by an external electronic device 1101, based on communication connection information received from a master device 1102. For example, a slave device 1103 may acquire communication data by monitoring a communication link between a master device 1102 and an external electronic device 1101.

FIG. 11 exemplifies that a slave device 1103 acquires communication data from an electronic device 1101 via sniffing or monitoring, but this is merely an example. In an embodiment, a slave device 1103 may receive communication data from a master device 1102 via a separate wireless communication connection to a master device 1102. In an embodiment, a slave device 1103 may receive communication data related to all channels (for example: an L channel and an R channel) or one channel (for example: the L channel) allocated from a master device 1102 to the slave device 1103.

Figure 12:
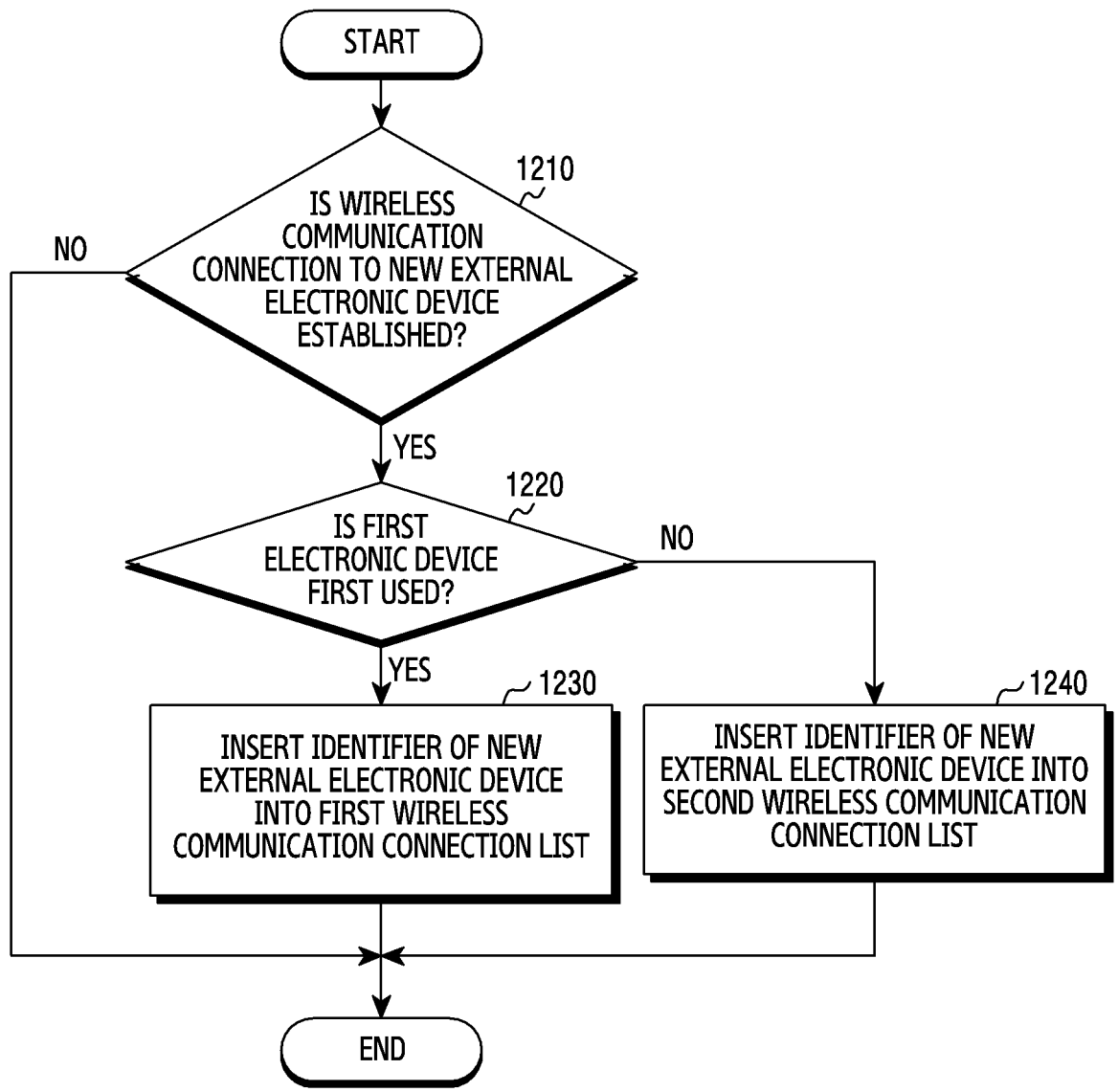
FIG. 12 is a flowchart showing an operation of renewing a wireless communication connection list of an electronic device set, according to an embodiment of the disclosure.

FIG. 12 is a flowchart showing an operation of renewing a wireless communication connection list of an electronic device set, according to an embodiment of the disclosure. FIG. 12 may be described with reference to the configurations of FIGS. 1 and 2.

Operations of FIG. 12 may be performed by a master device (for example: a first electronic device 110) among electronic devices (for example: a first electronic device 110 and a second electronic device 120) which constitute an electronic device set 100.

In an embodiment, in a state where electronic devices (for example: a first electronic device 110 and a second electronic device 120), which constitute an electronic device set 100, are inserted into a case (for example: a case 510), a master device (for example: the first electronic device 110) among the electronic devices (for example: the first electronic device 110 and the second electronic device 120) may broadcast a packet when a manipulation is applied to the case 510.

In an embodiment, an external electronic device (for example: a user mobile phone) which has received a packet broadcast by a master device (for example: a first electronic device 110) may display, on a display device of the external electronic device, a screen (for example: a pop-up window) indicating that a packet has been received. In an embodiment, when a user applies a predesignated input for a wireless communication connection to an external electronic device which has received a packet, an external electronic device may establish a wireless communication connection to a master device (for example: a first electronic device 110).

Referring to FIG. 12, in operation 1210, a master device (for example: a first electronic device 110) of an electronic device set 100 may identify whether or not a wireless communication connection to a new external electronic device (for example: first external electronic device 310) is established. In an embodiment, a new external electronic device may be an electronic device which is not included in a wireless communication connection lists of an electronic device set 100.

Referring to FIG. 12, in operation 1210, in case that it is identified that a wireless communication connection to a new external electronic device (for example: a first external electronic device 310) is established (determined as "Yes"), a master device (for example: a first electronic device 110) may perform operation 1210. Referring to FIG. 12, in operation 1210, in case that it is identified that a wireless communication connection to a new external electronic device (for example: a first external electronic device 310) is not established (determined as "No"), a master device (for example: a first electronic device 110) may terminate an operation according to FIG. 12.

Referring to FIG. 12, in operation 1220, based on a sensing value of each of electronic devices (for example: a first electronic device 110 and a second electronic device 120), a master device (for example: a first electronic device 110) of an electronic device set 100 may identify whether or not the first electronic device 110 is first used. In an embodiment, in case that a user applies an input (for example: a touch input or a hovering input) through a input device 230 of a first electronic device 110 (or a second electronic device 120), the first electronic device 110 (or the second electronic device 120) may identify that the first electronic device 110 (or the second electronic device 120) is to be used.

Referring to FIG. 12, in operation 1220, in case that it is identified that a first electronic device 110 is first used (determined as "Yes"), a master device (for example: a first electronic device 110) may perform operation 1230. Referring to FIG. 12, in operation 1220, in case that it is identified that a second electronic device 120 is first used (determined as "No"), a master device (for example: a first electronic device 110) may perform operation 1240.

Referring to FIG. 12, in operation 1230, a master device (for example: a first electronic device 110) may insert an identifier of a new external electronic device (for example: a first external electronic device 310) into a first wireless communication connection list.

Referring to FIG. 12, in operation 1240, a master device (for example: a first electronic device 110) may insert an identifier of a new external electronic device (for example: a first external electronic device 310) into a second wireless communication connection list.

Figure 13:
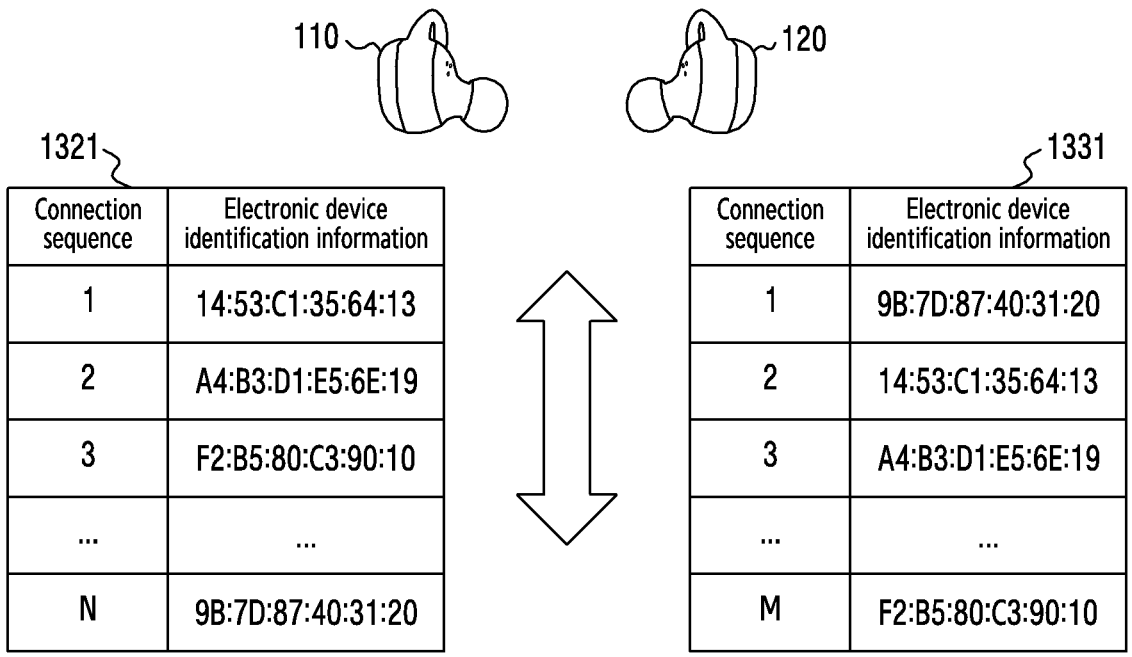
FIG. 13 is a block diagram showing an electronic device in a network environment according to an embodiment of the disclosure.
Figure 13:
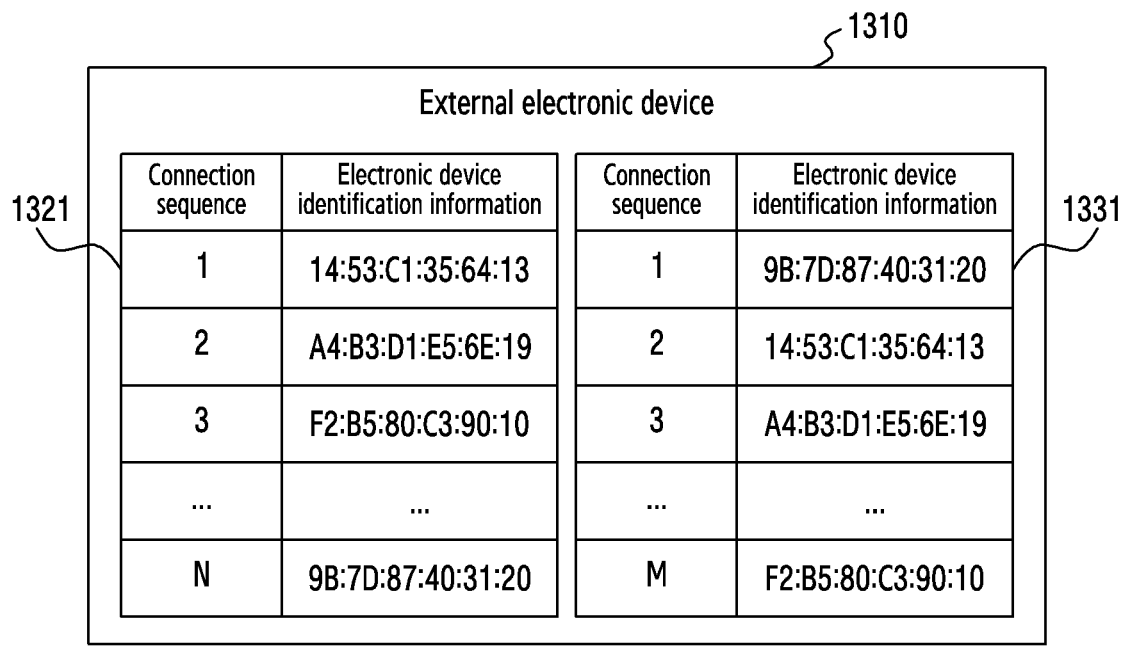

FIG. 13 is a block diagram showing electronic devices (for example: a first electronic device 110 and a second electronic device 120) in a network environment according to an embodiment of the disclosure. FIG. 13 may be described with reference to the configurations of FIGS. 1 and 2.

Referring to FIG. 13, a first electronic device 110 may store, in a memory (for example: a memory 280), a first wireless communication connection list 1321 in which a connection sequence and electronic device identification information on N number of external electronic devices are matched. Referring to FIG. 13, a second electronic device 120 may store, in a memory (for example: a memory 280), a second wireless communication connection list 1331 in which a connection sequence and electronic device identification information on M number of external electronic devices are matched. In an embodiment, N and M may be natural numbers.

In an embodiment, a master device (for example: a first electronic device 110) among electronic devices (for example: the first electronic device 110 and a second electronic device 120) may receive, from a slave device (for example: the second electronic device 120), a wireless communication connection list (for example: a second wireless communication connection list 1331) of the slave device (for example: the second electronic device 120).

In an embodiment, a master device (for example: a first electronic device 110) among electronic devices (for example: the first electronic device 110 and a second electronic device 120) may transmit a first wireless communication connection list 1321 and a second wireless communication connection list 1331 to an external electronic device 1310 for which a wireless communication connection is established.

In an embodiment, an external electronic device 1310 may receive a first wireless communication connection list 1321 and a second wireless communication connection list 1331.

In an embodiment, an external electronic device 1310 may display a received first wireless communication connection list 1321 and a second wireless communication connection list 1331 through a display device (or a display) (not shown).

In an embodiment, a user of an external electronic device 1310 may edit a first wireless communication connection list 1321 and a second wireless communication connection list 1331 which are being displayed.

In an embodiment, by adjusting a sequence of pieces of electronic device identification information included in a first wireless communication connection list 1321 which is being displayed, a user of an external electronic device 1310 may adjust a connection sequence of external electronic devices indicated by the pieces of electronic device identification information, respectively. In an embodiment, by adjusting a sequence of pieces of electronic device identification information included in a second wireless communication connection list 1331 which is being displayed, a user of an external electronic device 1310 may adjust a connection sequence of external electronic devices indicated by the pieces of electronic device identification information, respectively.

In an embodiment, a user of an external electronic device 1310 may insert, into a second wireless communication connection list 1331, at least one piece of electronic device identification information among pieces of electronic device identification information included in a first wireless communication connection list 1321 which is being displayed. In an embodiment, a user of an external electronic device 1310 may insert, into a first wireless communication connection list 1321, at least one piece of electronic device identification information from among pieces of electronic device identification information included in a second wireless communication connection list 1331 which is being displayed.

In an embodiment, when editing of a first wireless communication connection list 1321 and a second wireless communication connection list 1331 is completed by a user, an external electronic device 1310 may transmit the completely edited first wireless communication connection list 1321 and second wireless communication connection list 1331 to a master device (for example: a first electronic device 110) among electronic devices (for example: the first electronic device 110 and a second electronic device 120).

In an embodiment, a master device (for example: a first electronic device 110) may receive, from an external electronic device 1310, a first wireless communication connection list 1321 and a second wireless communication connection list 1331, which are completely edited.

In an embodiment, based on a first wireless communication connection list 1321 and a second wireless communication connection list 1331 which are received, a master device (for example: a first electronic device 110) may renew an own wireless communication connection list (for example: the first wireless communication connection list 1321) thereof.

In an embodiment, a master device (for example: a first electronic device 110) may transmit, to a slave device (for example: a second electronic device 120), a wireless communication connection list (for example: a second wireless communication connection list 1331) corresponding to the slave device (for example: the second electronic device 120).

In an embodiment, based on a received wireless communication connection list (for example: a second wireless communication connection list 1331), a slave device (for example: a second electronic device 120) may renew a wireless communication connection list (for example: a second wireless communication connection list 1331).

As described above, an electronic device (a first electronic device 110 or a second electronic device 120) and an operation method thereof according to an embodiment may identify an audio source device desired by a user in an environment where multiple audio source devices exist, and may perform a wireless communication connection to the identified audio source device.

As described above, an electronic device (for example: a first electronic device 110) according to an embodiment may include: a speaker 251; a communication circuit 220; a processor 210 operably connected to the speaker 251 and the communication circuit 220; and a memory 280 operably connected to the processor 210, wherein the memory 280 stores instructions for causing the processor 210, when executed, to: identify a first wireless communication connection event; when the first wireless communication connection event is identified, select one wireless communication connection list from among a first wireless communication connection list of the electronic device (for example: the first electronic device 110) and a second wireless communication connection list of a counterpart electronic device (for example: a second electronic device 120); identify, from the selected wireless communication connection list, an external electronic device for which a wireless communication connection is to be established; establish a wireless communication connection to the external electronic device identified from the selected wireless communication connection list; and output, through the speaker 251, a signal received from the identified external electronic device.

In an embodiment, the instructions may cause the processor 210, when executed, to: when the first wireless communication connection event of the electronic device (for example: the first electronic device 110) occurs before a second wireless communication connection event of the counterpart electronic device (for example: the second electronic device 120), select the first wireless communication connection list; and when the first wireless communication connection event of the electronic device (for example: the first electronic device 110) occurs after the second wireless communication connection event of the counterpart electronic device (for example: the second electronic device 120), select the second wireless communication connection list.

In an embodiment, the instructions may cause the processor 210, when executed, to: when a state where the electronic device (for example: the first electronic device 110) is worn on at least a part of a user's body is identified, determine that the first wireless communication connection event is identified; and when a state where the counterpart electronic device (for example: the second electronic device 120) is worn on at least a part of the user's body is identified, determine that the second wireless communication connection event is identified.

In an embodiment, the instructions may cause the processor 210, when executed, to: when a state where the electronic device (for example: the first electronic device 110) is detached from a case 510 in which an electronic device set 100 (for example: the first electronic device 110 and the second electronic device 120) is received is identified, determine that the first wireless communication connection event is identified; and when a state where the counterpart electronic device (for example: the second electronic device 120) is detached from the case 510 in which the electronic device set 100 is received is identified, determine that the second wireless communication connection event is identified.

In an embodiment, the electronic device (for example: the first electronic device 110) may further include an input device 230, and the instructions may cause the processor 210, when executed, to: when a user input is identified through the input device 230, determine that the first wireless communication connection event is identified; and when a user input is identified through an input device 230 of the counterpart electronic device (for example: the second electronic device 120), determine that the second wireless communication connection event is identified.

In an embodiment, the instructions may cause the processor 210, when executed, to: when the first wireless communication connection event of the electronic device (for example: the first electronic device 110) occurs after the second wireless communication connection event of the counterpart electronic device (for example: the second electronic device 120), transmit a request for the second wireless communication connection list to the counterpart electronic device (for example: the second electronic device 120); and receive the second wireless communication connection list from the counterpart electronic device (for example: the second electronic device 120).

In an embodiment, the instructions may cause the processor 210, when executed, to: when a wireless communication connection to the external electronic device identified from the selected wireless communication connection list fails, identify another external electronic device from the selected wireless communication connection list; and establish a wireless communication connection to the newly identified external electronic device.

In an embodiment, the instructions may cause the processor 210, when executed, to: when all wireless communication connections to external electronic devices included in the selected wireless communication connection list fail, select the other wireless communication connection list which has not been selected from among the first wireless communication connection list and the second wireless communication connection list; and establish wireless communication connections to external electronic devices included in the newly selected wireless communication connection list.

In an embodiment, the instructions may cause the processor 210, when executed, to, when a wireless communication connection to the external electronic device identified from the selected wireless communication connection list is established, transmit, to the counterpart electronic device (for example: the second electronic device 120), wireless communication connection information indicating the wireless communication connection to the external electronic device.

In an embodiment, the instructions may cause the processor 210, when executed, to transmit, to the counterpart electronic device (for example: the second electronic device 120), the signal received from the identified external electronic device.

As described above, a method for operating an electronic device (for example: a first electronic device 110) according to an embodiment may include: identifying a first wireless communication connection event; when the first wireless communication connection event is identified, selecting one wireless communication connection list from among a first wireless communication connection list of the electronic device (for example: the first electronic device 110) and a second wireless communication connection list of the counterpart electronic device (for example: a second electronic device 120); identifying, from the selected wireless communication connection list, an external electronic device for which a wireless communication connection is to be established; establishing, by using a communication circuit 220 of the electronic device (for example: the first electronic device 110), a wireless communication connection to the external electronic device identified from the selected wireless communication connection list; and outputting, through a speaker 251 of the electronic device (for example: the first electronic device 110), a signal received from the identified external electronic device.

In an embodiment, the selecting of the one wireless communication connection list may further include: when the first wireless communication connection event of the electronic device (for example: the first electronic device 110) occurs before a second wireless communication connection event of the counterpart electronic device (for example: the second electronic device 120), selecting the first wireless communication connection list; and when the first wireless communication connection event of the electronic device (for example: the first electronic device 110) occurs after the second wireless communication connection event of the counterpart electronic device (for example: the second electronic device 120), selecting the second wireless communication connection list.

In an embodiment, the identifying of the wireless communication connection event may further include: when a state where the electronic device (for example: the first electronic device 110) is worn on at least a part of a user's body is identified, determining that the first wireless communication connection event is identified; and when a state where the counterpart electronic device (for example: the second electronic device 120) is worn on at least a part of the user's body is identified, determining that the second wireless communication connection event is identified.

In an embodiment, the identifying of the wireless communication connection event may further include: when a state where the electronic device (for example: the first electronic device 110) is detached from a case 510 in which the electronic device set 100 is received is identified, determining that the first wireless communication connection event is identified; and when a state where the counterpart electronic device (for example: the second electronic device 120) is detached from the case 510 in which the electronic device set 100 is received is identified, determining that the second wireless communication connection event is identified.

In an embodiment, the identifying of the wireless communication connection event may further include: when a user input is identified through an input device 230 of the electronic device (for example: the first electronic device 110), determining that the first wireless communication connection event is identified; and when a user input is identified through an input device 230 of the counterpart electronic device (for example: the second electronic device 120), determining that the second wireless communication connection event is identified.

In an embodiment, the method may further include: when the first wireless communication connection event of the electronic device (for example: the first electronic device 110) occurs after the second wireless communication connection event of the counterpart electronic device (for example: the second electronic device 120), transmit a request for the second wireless communication connection list to the counterpart electronic device (for example: the second electronic device 120); and receiving the second wireless communication connection list from the counterpart electronic device (for example: the second electronic device 120).

In an embodiment, the method may further include: when a wireless communication connection to the external electronic device identified from the selected wireless communication connection list fails, identifying another external electronic device from the selected wireless communication connection list; and establishing a wireless communication connection to the newly identified external electronic device.

In an embodiment, the method may further include: when all wireless communication connections to external electronic devices included in the selected wireless communication connection list fail, selecting the other wireless communication connection list which has not been selected from among the first wireless communication connection list and the second wireless communication connection list; and establishing wireless communication connections to external electronic devices included in the newly selected wireless communication connection list.

In an embodiment, the method may further include, when a wireless communication connection to the external electronic device identified from the selected wireless communication connection list is established, transmitting, to the counterpart electronic device (for example: the second electronic device 120), wireless communication connection information indicating the wireless communication connection to the external electronic device.

In an embodiment, the method may further include transmitting, to the counterpart electronic device (for example: the second electronic device 120), the signal received from the identified external electronic device.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a speaker;
a communication circuit;
a processor operably connected to the speaker and the communication circuit; and
a memory operably connected to the processor,
wherein the memory stores instructions for causing the processor, when executed, to:
determine an identification sequence of a first wireless communication connection event of the electronic device and a second wireless communication connection event of a counterpart electronic device, based on the determined identification sequence, select a wireless communication connection list from among a first wireless communication connection list of the electronic device and a second wireless communication connection list of the counterpart electronic device, identify, from the selected wireless communication connection list, an external electronic device for which a wireless communication connection is to be established, establish the wireless communication connection to the external electronic device identified from the selected wireless communication connection list, and output, through the speaker, a signal received from the external electronic device.

2. The electronic device of claim 1, wherein the instructions further cause the processor, when executed, to:

when the first wireless communication connection event of the electronic device occurs before the second wireless communication connection event of the counterpart electronic device, select the first wireless communication connection list, and when the first wireless communication connection event of the electronic device occurs after the second wireless communication connection event of the counterpart electronic device, select the second wireless communication connection list.

3. The electronic device of claim 1, wherein the instructions further cause the processor, when executed, to:

when a state where the electronic device is worn on at least a part of a user's body is identified, determine that the first wireless communication connection event is identified, and when a state where the counterpart electronic device is worn on at least a part of the user's body is identified, determine that the second wireless communication connection event is identified.

4. The electronic device of claim 1, wherein the instructions further cause the processor, when executed, to:

when a state where the electronic device is detached from a case in which the electronic device set is received is identified, determine that the first wireless communication connection event is identified, and when a state where the counterpart electronic device is detached from the case in which the electronic device set is received is identified, determine that the second wireless communication connection event is identified.

5. The electronic device of claim 1, further comprising: an input device, wherein the instructions further cause the processor, when executed, to:

when a user input is identified through the input device, determine that the first wireless communication connection event is identified, and when a user input is identified through an input device of the counterpart electronic device, determine that the second wireless communication connection event is identified.

6. The electronic device of claim 1, wherein the instructions further cause the processor, when executed, to:

when the first wireless communication connection event of the electronic device occurs after the second wireless communication connection event of the counterpart electronic device, transmit a request for the second wireless communication connection list to the counterpart electronic device, and receive the second wireless communication connection list from the counterpart electronic device.

7. The electronic device of claim 6, wherein the instructions further cause the processor, when executed, to:

when all wireless communication connections to external electronic devices included in the selected wireless communication connection list fail, select another wireless communication connection list which was not selected from among the first wireless communication connection list and the second wireless communication connection list, and establish wireless communication connections to external electronic devices included in the selected other wireless communication connection list.

8. The electronic device of claim 1, wherein the instructions further cause the processor, when executed, to:

when a wireless communication connection to the external electronic device identified from the selected wireless communication connection list fails, identify another external electronic device from the selected wireless communication connection list, and establish a wireless communication connection to the other external electronic device.

9. The electronic device of claim 1, wherein the instructions further cause the processor, when executed, to:

when a wireless communication connection to the external electronic device identified from the selected wireless communication connection list is established, transmit, to the counterpart electronic device, wireless communication connection information indicating the wireless communication connection to the external electronic device.

10. The electronic device of claim 1, wherein the instructions further cause the processor, when executed, to transmit, to the counterpart electronic device, the signal received from the identified external electronic device.

11. A method for operating an electronic device, the method comprising:

determining an identification sequence of a first wireless communication connection event of the electronic device and a second wireless communication connection event of a counterpart electronic device;

based on the determined identification sequence, selecting one wireless communication connection list from among a first wireless communication connection list of the electronic device and a second wireless communication connection list of the counterpart electronic device;

identifying, from the selected wireless communication connection list, an external electronic device for which a wireless communication connection is to be established;

establishing, by using a communication circuit of the electronic device, a wireless communication connection to the external electronic device identified from the selected wireless communication connection list; and outputting, through a speaker of the electronic device, a signal received from the identified external electronic device.

12. The method of claim 11, wherein the selecting of the one wireless communication connection list further comprises:

when the first wireless communication connection event of the electronic device occurs before the second wireless communication connection event of the counterpart electronic device, selecting the first wireless communication connection list, and when the first wireless communication connection event of the electronic device occurs after the second wireless communication connection event of the counterpart electronic device, selecting the second wireless communication connection list.

13. The method of claim 11, wherein the determining of the identification sequence of the first wireless communication connection event and the second wireless communication connection event further comprises:

when a state where the electronic device is worn on at least a part of a user's body is identified, determining that the first wireless communication connection event is identified, and when a state where the counterpart electronic device is worn on at least a part of the user's body is identified, determining that the second wireless communication connection event is identified.

14. The method of claim 11, wherein the determining of the identification sequence of the first wireless communication connection event and the second wireless communication connection event further comprises:

when a state where the electronic device is detached from a case in which an electronic device set is received is identified, determining that the first wireless communication connection event is identified, and when a state where the counterpart electronic device is detached from the case in which the electronic device set is received is identified, determining that the second wireless communication connection event is identified.

15. The method of claim 11, wherein the determining of the identification sequence of the first wireless communication connection event and the second wireless communication connection event further comprises:

when a user input is identified through an input device of the electronic device, determining that the first wireless communication connection event is identified, and when a user input is identified through an input device of the counterpart electronic device, determining that the second wireless communication connection event is identified.

16. The method of claimer 11, further comprising:

when the first wireless communication connection event of the electronic device occurs after the second wireless communication connection event of the counterpart electronic device, transmitting a request for the second wireless communication connection list to the counterpart electronic device; and receiving the second wireless communication connection list from the counterpart electronic device.

17. The method of claim 16, further comprising:

when all wireless communication connections to external electronic devices included in the selected wireless communication connection list fail, selecting another wireless communication connection list which was not selected from among the first wireless communication connection list and the second wireless communication connection list; and establishing wireless communication connections to external electronic devices included in the selected other wireless communication connection list.

18. The method of claim 11, further comprising:

when a wireless communication connection to the external electronic device identified from the selected wireless communication connection list fails, identifying another external electronic device from the selected wireless communication connection list; and establishing a wireless communication connection to the other external electronic device.

19. The method of claim 11, further comprising, when a wireless communication connection to the external electronic device identified from the selected wireless communication connection list is established, transmitting, to the counterpart electronic device, wireless communication connection information indicating the wireless communication connection to the external electronic device.

20. The method of claim 11, further comprising transmitting, to the counterpart electronic device, the signal received from the identified external electronic device.

* * * * *